(12) United States Patent
Hoshikawa et al.

(10) Patent No.: US 7,859,229 B2
(45) Date of Patent: Dec. 28, 2010

(54) DISCHARGE DEVICE

(75) Inventors: Hisanori Hoshikawa, Osaka (JP); Kyoichiro Araki, Kanagawa (JP); Isao Yamamoto, Kanagawa (JP); Youichi Tamegai, Kanagawa (JP)

(73) Assignees: Panasonic Photo & Lighting Co., Ltd., Osaka (JP); Rohm Co., Ltd., Kyoto (JP)

( * ) Notice: Subject to any disclaimer, the term of this patent is extended or adjusted under 35 U.S.C. 154(b) by 736 days.

(21) Appl. No.: 11/887,232

(22) PCT Filed: Mar. 29, 2006

(86) PCT No.: PCT/JP2006/306466
§ 371 (c)(1),
(2), (4) Date: Sep. 27, 2007

(87) PCT Pub. No.: WO2006/104194
PCT Pub. Date: Oct. 5, 2006

(65) Prior Publication Data
US 2009/0009144 A1 Jan. 8, 2009

(30) Foreign Application Priority Data
Mar. 29, 2005 (JP) ............................ 2005-093359
Jun. 6, 2005 (JP) ............................ 2005-164912
Jun. 6, 2005 (JP) ............................ 2005-164913

(51) Int. Cl.
*H02J 7/00* (2006.01)
*H02M 3/06* (2006.01)
*H02M 5/16* (2006.01)

(52) U.S. Cl. .................. 320/166; 307/109; 307/110; 363/171

(58) Field of Classification Search ................. 320/166
See application file for complete search history.

(56) References Cited

U.S. PATENT DOCUMENTS 6,020,724 A * 2/2000 O'Loughlin ................. 320/166
6,384,579 B2 * 5/2002 Watanabe .................... 320/166
6,636,021 B2 * 10/2003 Schenkel et al. ............ 320/166

FOREIGN PATENT DOCUMENTS

| JP | 5-336745 | 12/1993 |
|----|----------|---------|
| JP | 11-84484 | 3/1999 |
| JP | 2000-245150 | 9/2000 |
| JP | 2001-183728 | 7/2001 |
| JP | 2003-45691 | 2/2003 |
| JP | 2003-98578 | 4/2003 |
| JP | 2004-6083 | 1/2004 |
| JP | 2004-180385 | 6/2004 |

* cited by examiner

*Primary Examiner*—Edward Tso
*Assistant Examiner*—Yalkew Fantu
(74) *Attorney, Agent, or Firm*—Steptoe & Johnson LLP

(57) ABSTRACT

A discharging device capable of realizing a proper PWM drive by accurately reflecting, as a strobe device, the secondary-side condition of a separately-excited strobe charging circuit being charged. A charging device which charges a main capacitor (2) via a separately-excited DC/DC converter and discharges the energy of the main capacitor, wherein a pulse width control circuit (1) for controlling a conduction pulse width on the primary side of the separately-excited DC/DC converter is provided, and this pulse width control circuit is configured such that a PWM soft start drive is performed that expands a conduction pulse width on the primary side of the separately-excited DC/DC converter stepwise up to a maximum pulse width.

11 Claims, 13 Drawing Sheets

FIG. 10

AN EXPERIMENTAL RESULT THAT EVALUATES A METHOD OF DEALING WITH HEAT GENERATION OF A TRANSFORMER AT THE TIME OF INTERMITTENT OPERATION BASED ON DETERMINATION OF OVERLOAD CONDITION

| TIME RATIO OF CHARGING/NO CHARGING | AVERAGE CURRENT CONSUMPTION | RISE IN TEMPERATURE OF TRANSFORMER COIL |
|---|---|---|
| 1 : 2 | 167 mA | ABOUT 46oC |
| 1 : 4 | 100 mA | ABOUT 25oC |
| 1 : 8 | 56 mA | ABOUT 12oC |

<MEASUREMENT CONDITION>

EVALUATION BOARD: CERAMIC
 DRIVING FREQUENCY: 600 kHz
 POWER SOURCE VOLTAGE: 4.2 V
 TRANSFORMER: PRIMARY INDUCTANCE 2.2 $\mu$H (VOLTAGE STEP-UP RATIO 17.5)
 PRIMARY-SIDE DETECTION RESISTOR: 0.1 $\Omega$

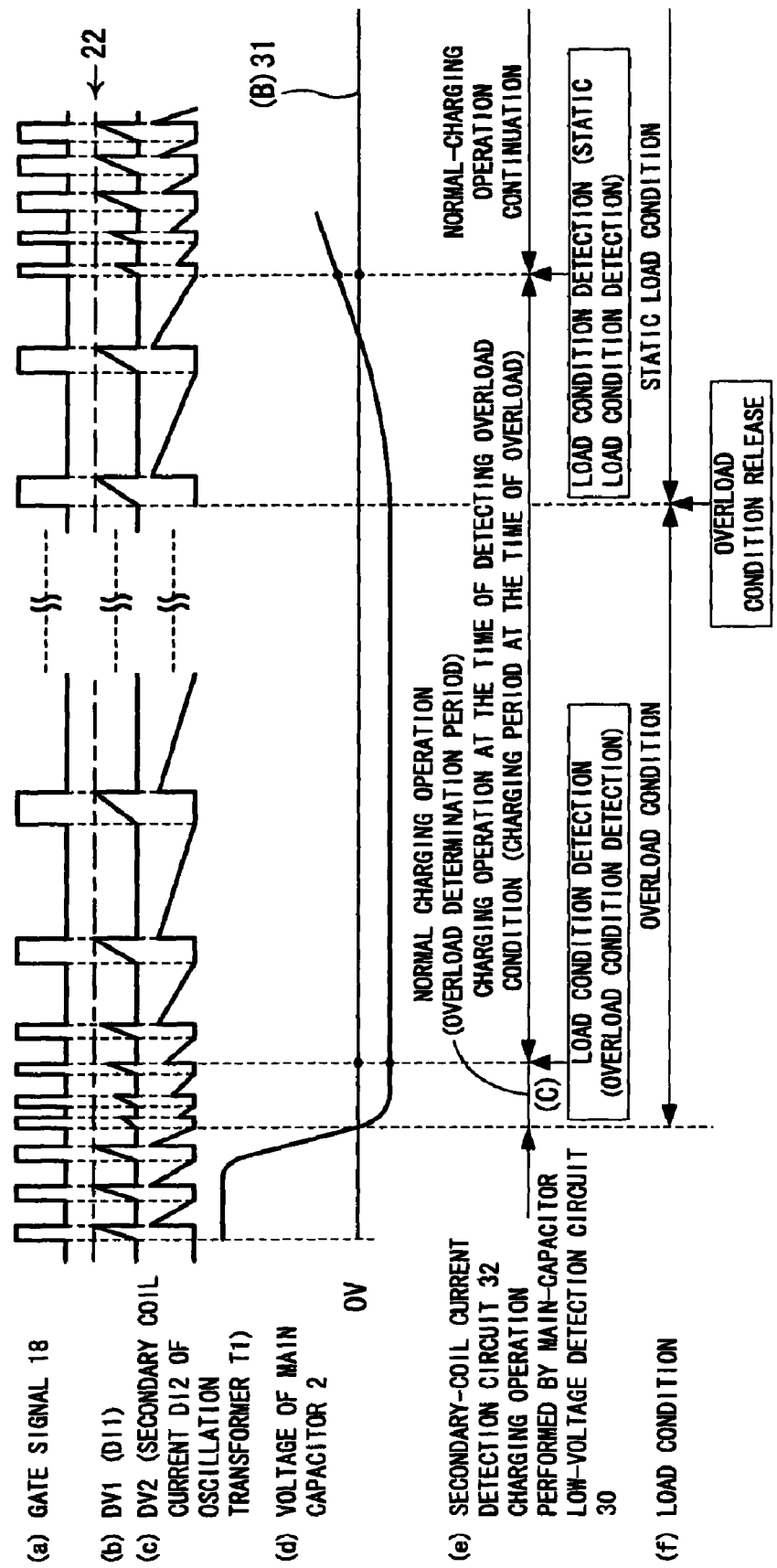

DISCHARGE DEVICE

The present application is based on International Application PCT/JP2006/306466, filed Mar. 29, 2006, which claims priority to Japanese Patent Applications No. 2005-093359, filed Mar. 29, 2005; No. 2005-164912, filed Jun. 6, 2005; and No. 2005-164913, filed Jun. 6, 2005, the entire contents of which are hereby incorporated by reference.

TECHNICAL FIELD

The present invention relates to a discharge device used as, for example, a strobe apparatus and the like.

BACKGROUND ART

In recent years, miniaturization of cameras such as digital still cameras has rapidly progressed, and mobile phone devices having small cameras have rapidly spread in the market. Hence, there has been an increase in demand for the strobe apparatuses employed as auxiliary light sources for photographing, and it is required to further decrease the size thereof.

The strobe apparatuses are a type of discharge devices, and such a conventional discharge device will be described as follows.

(Conventional Technology 1)

In the strobe apparatus that is one of the conventional discharge devices, as disclosed in Japanese Unexamined Patent Application Publication No. 7-85988, a main capacitor is charged by at least stepwise or continuously switching among appropriate driving pulse widths and duty ratios on the basis of a battery voltage at the time of driving a primary side of a separately-excited strobe charging circuit, a battery voltage in the middle of the charging operation, and charging voltages in the beginning and middle of the charging operation of a secondary side main capacitor.

In a strobe apparatus disclosed in Japanese Unexamined Patent Application Publication No. 2004-6083, a state of a battery right before being charged is detected by a microcomputer and the microcomputer controls a driving pulse width depending on the state of the battery such that overcurrent does not flow in the battery.

(Conventional Technology 2)

In a conventional strobe apparatus (see Japanese Unexamined Patent Application Publication No. 5-316729), a separately-excited DC/DC converter adopts a driving system in which the converter outputs a signal by comparing a charging voltage of a main capacitor with a triangular-wave voltage having a low frequency outputted from a triangular wave generator and converts the output signal into a PWM signal for driving. In the conventional strobe apparatus, when the charging voltage is excessively low at a starting time, the converter lowers a driving frequency relative to a static driving frequency so as not to cause overcurrent, thereby driving a battery with the pulse width in a turn-on period being decreased relatively for each control cycle.

In another conventional strobe apparatus (for example, see Japanese Unexamined Patent Application Publication No. 11-84484), a separately-excited DC/DC converter performs a PWM control by using a micro computer. In this conventional strobe apparatus, when a charging voltage of a main capacitor is excessively low, the converter does not change a control cycle so as not to cause overcurrent and decreases a pulse width for driving, compared to a case where the charging voltage is in the static state.

In another conventional strobe apparatus, (for example, see Japanese Unexamined Patent Application Publication No. 11-87083), an inrush current at the time of oscillating a transformer for charging a main capacitor is controlled by using a separately excited fly-back mode. In the conventional strobe apparatus, when a relatively high detection value is detected by a charging voltage detection circuit that is used for detecting a charging voltage of the main capacitor, a CPU controls generation of an output pulse so as to reduce a charging time of the main capacitor such that a pulse width of a strobe pulse signal, which is output from a strobe pulse signal generation circuit, for driving the oscillation transformer relatively increases or a pulse period of the strobe pulse signal relatively decreases.

DISCLOSURE OF THE INVENTION

The Problem that the Invention is to Solve

However, in the configuration of Conventional Technology 1 (which is disclosed in Japanese Unexamined Patent Application Publication No. 7-85988), since the drive pulse width and the duty ratio are determined on the basis of the detection result of only the battery voltage that is obtained when a load is applied to the battery, a PWM (Pulse Width Modulation) drive pulse may not be appropriately set, and overcurrent may flow in the battery.

Additionally, in the configuration of Conventional Technology 1 (which is disclosed in Japanese Unexamined Patent Application Publication No. 2004-6083), it is possible to implement the driving operation based on a drive pulse that is appropriately set so as not to cause overcurrent due to a change in battery internal resistance caused by a consumption state of the battery, a thermal condition, or the like. However, since it is difficult to precisely reflect a secondary side condition of the separately-excited strobe charging circuit being charged, a further appropriate driving method is required.

Accordingly, it can be considered that the PWM drive is performed by determining the drive pulse width and the duty ratio on the basis of a charging voltage in the beginning and middle of the charging operation of the secondary side main capacitor of the separately-excited strobe charging circuit by using the micro computer. However, in a circuit design of the strobe apparatus, when it is necessary to change the driving frequency or the inductance of the oscillation transformer in order to satisfy strobe performances required for various cameras, it is required to change a program of the micro computer whenever necessary or to include in the micro computer a correlation table of appropriate PWM drive pulse widths corresponding to the main capacitor voltages and the like, and thereby a control operation becomes complicated.

It is an object of the invention to provide a discharge device, which is a strobe apparatus, capable of implementing an optimum PWM drive by exactly reflecting the secondary side condition of the separately-excited strobe charging circuit being charged.

Additionally, it is an object to provide a discharge device capable of responding to a case where it is necessary to change the design of the driving frequency and the inductance of the oscillation transformer with a simple setting change.

In addition, as described in Conventional Technology 2, in the case where the PWM drive is performed by the micro computer or by a circuit for comparing with a triangular wave, it is not possible to be sufficiently assured that a current increase or a heat generation caused by the current increase due to changes of the driving frequency, fluctuation of the inductance of the transformer, and power source voltage in the state of a complete short of the main capacitor is avoided when the driving frequency increases.

Consequently, in the case where the driving frequency is high, there is a possibility that the inrush current is caused by the overcurrent caused by magnetic saturation due to residual energy of the secondary side after discharge on the basis of a change of parameters such as the driving frequency, the inductance of the transformer, and the power source voltage. Therefore, when the pulse width period is set to be excessively short so as to avoid the aforementioned problem, there is a problem that the starting operation of the charging operation is deteriorated.

In order to solve the problems of Conventional Technology 2, the present invention provides a discharge device capable of decreasing a size of the configuration, suppressing heat generation thereof by preventing the overcurrent, and protecting circuit elements against destruction caused by the heat generation during its charging operation, even when the charging operation is performed in the case where the main capacitor is in the condition of overload such as a short state and the charging voltage is excessively lowered, wherein a pulse width is controlled on the basis of a random control frequency selected in the range of low to high frequencies.

Means for Solving the Problems

According to the invention, in a discharge device for charging a main capacitor via a separately-excited DC/DC converter and discharging energy from the main capacitor, the discharge device comprising a pulse width control circuit for controlling a conduction pulse width on a primary side of the separately-excited DC/DC converter, the pulse width control circuit is configured to perform a PWM soft start drive of stepwise increasing the conduction pulse width on the primary side of the separately-excited DC/DC converter up to a maximum pulse width in a case where the main capacitor has a voltage less than a predetermined low voltage at the time of charging the main capacitor and to perform a PWM drive with the maximum pulse width when the main capacitor has a voltage not less than the predetermined low voltage at the time of charging the main capacitor.

According to the invention, in a discharge device for charging a main capacitor via a separately-excited DC/DC converter and discharging energy from the main capacitor, the discharge device comprising a pulse width control circuit for controlling a conduction pulse width on a primary side of the separately-excited DC/DC converter, the pulse width control circuit is configured to perform a PWM soft start drive of stepwise increasing the conduction pulse width on the primary side of the separately-excited DC/DC converter up to a maximum pulse width when the main capacitor has a voltage less than a predetermined low voltage at the time of charging the main capacitor, to perform a PWM drive with the maximum pulse width when the main capacitor has a voltage not less than the predetermined low voltage at the time of charging the main capacitor, and to perform the PWM drive with the maximum pulse width by detecting that the main capacitor reaches a predetermined voltage and terminating the PWM soft start drive in course of performing the PWM soft start drive of stepwise increasing a conduction pulse width on the primary side of the separately-excited DC/DC converter up to a maximum pulse width when the main capacitor has a voltage less than the predetermined low voltage at the time of charging the main capacitor.

In the discharge device according to the invention, the pulse width control circuit includes a triangular-wave voltage generation circuit for generating a triangular-wave voltage at a predetermined repetition frequency; a soft-start voltage generation circuit for generating a soft-start voltage that increases with the lapse of time after starting the charging operation; a comparator for comparing the triangular-wave voltage with the soft-start voltage and outputting a signal with a duty ratio that gradually increases a conduction time at a single frequency with the time elapsed from the start of the charging operation; a soft-start voltage canceling circuit for canceling a soft start operation by detecting that a terminal voltage of the main capacitor increases to a preset voltage; and a logic circuit for charging the main capacitor on the basis of an output of the comparator until the main capacitor is fully charged and terminating the changing operation when detecting that the main capacitor is fully charged.

According to the invention, an application specific integrated circuit constituting the discharge device as described above, the application specific integrated circuit comprising: a triangular-wave voltage generation circuit for generating a triangular-wave voltage at a single frequency; a soft-start voltage generation circuit for generating a soft-start voltage that increases with the lapse of time after starting the charging operation; a comparator for comparing the triangular-wave voltage with the soft-start voltage and outputting a signal with a duty ratio that gradually increases a conduction time at a single frequency with the time elapsed from the start of the charging operation; a soft-start voltage canceling circuit for canceling a soft start operation by detecting that a terminal voltage of the main capacitor increases to a preset voltage; and a logic circuit for charging the main capacitor on the basis of output of the comparator until the main capacitor is fully charged and terminating the changing operation when detecting that the main capacitor is fully charged.

According to the invention, in a discharge device for charging a main capacitor via a separately-excited DC/DC converter and discharging energy from the main capacitor, the discharge device comprising a pulse width control circuit for controlling a conduction pulse width on a primary side of the separately-excited DC/DC converter, the pulse width control circuit is configured to perform a PWM soft start drive of stepwise increasing the conduction pulse width on the primary side of the separately-excited DC/DC converter up to a maximum pulse width when the main capacitor has a voltage less than a predetermined low voltage at the time of charging the main capacitor, to perform a PWM drive with the maximum pulse width when the main capacitor has a voltage not less than the predetermined low voltage at the time of charging the main capacitor, and to determine that the separately-excited DC/DC converter is in an overload condition and to perform the pulse width control by the use of an intermittent drive of alternately performing a charging operation and a no-charging operation on the main capacitor at a predetermined time ratio when a charging voltage of the main capacitor does not reach a predetermined voltage with the lapse of a predetermined time after starting the charging operation.

According to the invention, in a discharge device for charging a main capacitor via a separately-excited DC/DC converter and discharging energy from the main capacitor, the discharge device comprising a pulse width control circuit for controlling a conduction pulse width on a primary side of the separately-excited DC/DC converter, the pulse width control circuit is configured to perform a PWM soft start drive of stepwise increasing the conduction pulse width on the primary side of the separately-excited DC/DC converter up to a maximum pulse width when the main capacitor has a voltage less than a predetermined low voltage at the time of charging the main capacitor, to perform a PWM drive with the maximum pulse width when the main capacitor has a voltage not less than the predetermined low voltage at the time of charging the main capacitor, to perform the PWM drive with the maximum pulse width by detecting that the main capacitor reaches a predetermined voltage and terminating the PWM soft start drive in course of performing the PWM soft start drive of stepwise increasing a conduction pulse width on the primary side of the separately-excited DC/DC converter up to a maximum pulse width when the main capacitor has a voltage less than the predetermined low voltage at the time of charging the main capacitor, and to determine that the separately-excited DC/DC converter is in an overload condition and to perform the pulse width control by the use of an intermittent drive of alternately performing a charging operation and a no-charging operation on the main capacitor at a predetermined time ratio when a charging voltage of the main capacitor does not reach a predetermined voltage with the lapse of a predetermined time after starting the charging operation.

In the discharge device according to the invention, the pulse width control circuit includes a triangular-wave voltage generation circuit for generating a triangular-wave voltage at a predetermined repetition frequency; a soft-start voltage generation circuit for generating a soft-start voltage that increases with the lapse of time after starting the charging operation; a comparator for comparing the triangular-wave voltage with the soft-start voltage and outputting a signal with a duty ratio that gradually increases a conduction time at a single frequency with the time elapsed from the start of the charging operation; a soft-start voltage canceling circuit for canceling a soft start operation by detecting that a terminal voltage of the main capacitor increases to a preset voltage; a logic circuit for charging the main capacitor on the basis of output of the comparator until the main capacitor is fully charged and terminating the changing operation when detecting that the main capacitor is fully charged; and a means for determining that the separately-excited DC/DC converter is in an overload condition and performing the pulse width control by the use of an intermittent drive of alternately performing a charging operation and a no-charging operation on the main capacitor at a predetermined time ratio when a charging voltage of the main capacitor does not reach a predetermined voltage with the lapse of a predetermined time after starting the charging operation.

According to the invention, an application specific integrated circuit constituting the discharge device as described above, the application specific integrated circuit comprising: a triangular-wave voltage generation circuit for generating a triangular-wave voltage at a single frequency; a soft-start voltage generation circuit for generating a soft-start voltage that increases with the lapse of time after starting the charging operation; a comparator for comparing the triangular-wave voltage with the soft-start voltage and outputting a signal with a duty ratio that gradually increases a conduction time at a single frequency with the time elapsed from the start of the charging operation; a soft-start voltage canceling circuit for canceling a soft start operation by detecting that a terminal voltage of the main capacitor increases to a preset voltage; a logic circuit for charging the main capacitor on the basis of an output of the comparator until the main capacitor is fully charged and terminating the charging operation when detecting that the main capacitor is fully charged; and a means for determining that the separately-excited DC/DC converter is in an overload condition and performing the pulse width control by the use of an intermittent drive of alternately performing a charging operation and a no-charging operation on the main capacitor at a predetermined time ratio when a charging voltage of the main capacitor does not reach a predetermined voltage with the lapse of a predetermined time after starting the charging operation.

According to the invention, in a discharge device for charging a main capacitor via a separately-excited DC/DC converter and discharging energy from the main capacitor, the discharge device comprising a pulse width control circuit for controlling a conduction pulse width on a primary side of the separately-excited DC/DC, the pulse width control circuit is configured to perform a PWM soft start drive of stepwise increasing the conduction pulse width on the primary side of the separately-excited DC/DC converter up to a maximum pulse width when the main capacitor has a voltage less than a predetermined low voltage at the time of charging the main capacitor, to perform a PWM drive with the maximum pulse width when the main capacitor has a voltage not less than the predetermined low voltage at the time of charging the main capacitor, and to determine that the separately-excited DC/DC converter is in an overload condition and to perform the pulse width control by the use of a looping drive of waiting discharge termination of current on the secondary side of the separately-excited DC/DC converter and performing a conduction operation of the primary side thereof when a charging voltage of the main capacitor does not reach a predetermined voltage with the lapse of a predetermined time after starting the charging operation at the time of charging the main capacitor.

According to the invention, in a discharge device for charging a main capacitor via a separately-excited DC/DC converter and discharging energy from the main capacitor, the discharge device comprising a pulse width control circuit for controlling a conduction pulse width on a primary side of the separately-excited DC/DC converter, the pulse width control circuit is configured to perform a PWM soft start drive of stepwise increasing the conduction pulse width on the primary side of the separately-excited DC/DC converter up to a maximum pulse width when the main capacitor has a voltage less than a predetermined low voltage at the time of charging the main capacitor, to perform a PWM drive with the maximum pulse width when the main capacitor has a voltage not less than the predetermined low voltage at the time of charging the main capacitor, to perform the PWM drive with the maximum pulse width by detecting that the main capacitor reaches a predetermined voltage and terminating the PWM soft start drive in course of performing the PWM soft start drive of stepwise increasing a conduction pulse width on the primary side of the separately-excited DC/DC converter up to a maximum pulse width when the main capacitor has a voltage less than the predetermined low voltage at the time of charging the main capacitor, and to determine that the separately-excited DC/DC converter is in an overload condition and to perform the pulse width control by the use of a looping drive of waiting discharge termination of current on the secondary side of the separately-excited DC/DC converter and performing a conduction operation of the primary side thereof when a charging voltage of the main capacitor does not reach a predetermined voltage with the lapse of a predetermined time after starting the charging operation at the time of charging the main capacitor.

In the discharge device according the invention, the pulse width control circuit includes a triangular-wave voltage generation circuit for generating a triangular-wave voltage at a predetermined repetition frequency; a soft-start voltage generation circuit for generating a soft-start voltage that increases with the lapse of time after starting the charging operation; a comparator for comparing the triangular-wave voltage with the soft-start voltage and outputting a signal with a duty ratio that gradually increases a conduction time at a single frequency with the time elapsed from the start of the charging operation; a soft-start voltage canceling circuit for canceling a soft start operation by detecting that a terminal voltage of the main capacitor increases to a preset voltage; a logic circuit for charging the main capacitor on the basis of output of the comparator until the main capacitor is fully charged and terminating the changing operation when detecting that the main capacitor is fully charged; means for determining that the separately-excited DC/DC converter is in an overload condition when a charging voltage of the main capacitor does not reach a predetermined voltage with the lapse of a predetermined time after starting the charging operation and outputting an overload signal indicative of the overload condition; and a secondary-coil current detection circuit for controlling the pulse width control by performing a looping drive of detecting secondary side current of the separately-excited DC/DC converter, waiting discharge termination of the current, and performing a conduction operation of the primary side thereof, when receiving the overload signal.

According to the invention, an application specific integrated circuit constituting the discharge device as described above comprising: a triangular-wave voltage generation circuit for generating a triangular-wave voltage at a single frequency; a soft-start voltage generation circuit for generating a soft-start voltage that increases with the lapse of time after starting the charging operation; a comparator for comparing the triangular-wave voltage with the soft-start voltage and outputting a signal with a duty ratio that gradually increases a conduction time at a single frequency with the time elapsed from the start of the charging operation; a soft-start voltage canceling circuit for canceling a soft start operation by detecting that a terminal voltage of the main capacitor increases to a preset voltage; a logic circuit for charging the main capacitor on the basis of an output of the comparator until the main capacitor is fully charged and terminating the charging operation when detecting that the main capacitor is fully charged; a means for outputting an overload signal indicative of the overload condition by determining that the separately-excited DC/DC converter is in an overload condition when a charging voltage of the main capacitor does not reach a predetermined voltage with the lapse of a predetermined time after starting the charging operation; and a secondary-coil current detection circuit for controlling the pulse width control by performing a looping drive of detecting secondary side current of the separately-excited DC/DC converter, waiting discharge termination of the current, and performing a conduction operation of the primary side thereof, when receiving the overload signal.

Advantage of the Invention

According to the discharge device of the invention as described above, a PWM soft start drive is performed which expands a conduction pulse width on the primary side of the separately-excited DC/DC converter stepwise up to a maximum pulse width. Therefore, it is possible to prevent occurrence of overcurrent even in a case of a high frequency drive (which is a repetition frequency having several hundreds of kilohertz). Additionally, in the case, power source ripple which occurs in a case of a low frequency drive does not occur, and there is no need to provide inductance parts which are necessary to remove the ripple, so that it is possible to realize an improvement in performance and a decrease in size.

In addition, according to the application specific integrated circuit of the invention, it is possible to promptly deal with a change of the inductance of the driving frequency and the oscillation transformer. There is provided an external connection terminal that connects with a time-constant determining element of at least one circuit of the triangular-wave voltage generation circuit and the soft-start voltage generation circuit. Therefore, it is possible to use the inductance of the driving frequency and the oscillation transformer for plural types of discharge devices by only exchanging parts connected to the outside.

Additionally, according to the invention, by using the main capacitor and the separately-excited DC/DC converter, it is determined that converter output is in an overload condition in a case where a charging voltage of the main capacitor does not reach a predetermined voltage for detecting overload when the charging operation is performed for a predetermined time. Then, the charging operation is stopped for a predetermined constant time, and a cycle of starting and stopping the charging operation may be repeated as long as the overload condition of the converter output is maintained.

In addition, charging operation time for determining whether the converter output is in the overload condition is set at an excessively short time by setting a low overload detection voltage, and then a ratio between predetermined times of the charging operation and the no-charging operation is set so that the no-charging operation time (charging suspension period) is sufficiently longer than the charging operation time. Hence, it is possible to reduce as much power consumption caused by the overload of the converter output as possible, and it is also possible to promptly start the charging operation for the main capacitor directly after the overload condition is released.

As described above, it is possible to decrease the size of the configuration, and it is also possible to protect the circuit element against the heat generation caused by the overcurrent, even when the main capacitor is in the overload condition such as a short state in the case where the drive is performed by using not only a low frequency but also a high frequency.

Additionally, according to the invention, by using the main capacitor and the separately-excited DC/DC converter, it is determined that the converter output is in the overload condition in the case where the charging voltage of the main capacitor does not reach the predetermined voltage for detecting overload when the charging operation is performed for a predetermined time. In accordance with the overload signal indicative of the overload condition, the looping drive that waits discharge termination of current in the secondary side and that moves to the conduction operation of the primary side is performed. Since OFF time during the looping drive excessively increases as compared with ON time, power consumption in the overload condition excessively decreases, so that it is possible to reduce as much power consumption caused by the overload of the converter output as possible. In addition, the looping drive is maintained as long as the overload condition of the converter output is maintained, and it is also possible to promptly start the normal charging operation for the main capacitor directly after the overload condition is released.

In addition, the charging operation time for determining whether the converter output is in the overload condition is set at the excessively short time by setting the low overload detection voltage. Therefore, it is possible to reduce as much power consumption caused by the overload of the converter output as possible, and it is also possible to promptly move to the normal charging operation for the main capacitor directly after the overload condition is released.

As described above, it is possible to excessively decrease a size of the configuration, to suppress heat generation thereof by preventing the overcurrent, and to protect a circuit element against destruction caused by the heat generation, even when the charging operation is performed in the case where the main capacitor is in the condition of overload such as a short state and the charging voltage is excessively lowered, wherein a pulse width is controlled by a random control frequency selected in the range of low to high frequencies.

BRIEF DESCRIPTION OF THE DRAWINGS

FIG. 10 is an explanatory diagram illustrating an experimental result that evaluates a method of dealing with heat generation of a transformer at the time of intermittent operation based on determination of the overload condition in the overload condition according to Embodiment 2.

FIG. 13 is a diagram illustrating waveforms of the principal portions and a timing chart (2) in the overload condition according to Embodiment 3.

BEST MODE FOR CARRYING OUT THE INVENTION

Hereinafter, a strobe apparatus as an example of discharge devices according to embodiments of the invention will be described with reference to drawings.

Embodiment 1

First, a discharge device according to Embodiment 1 of the invention will be described.

Figure 1:
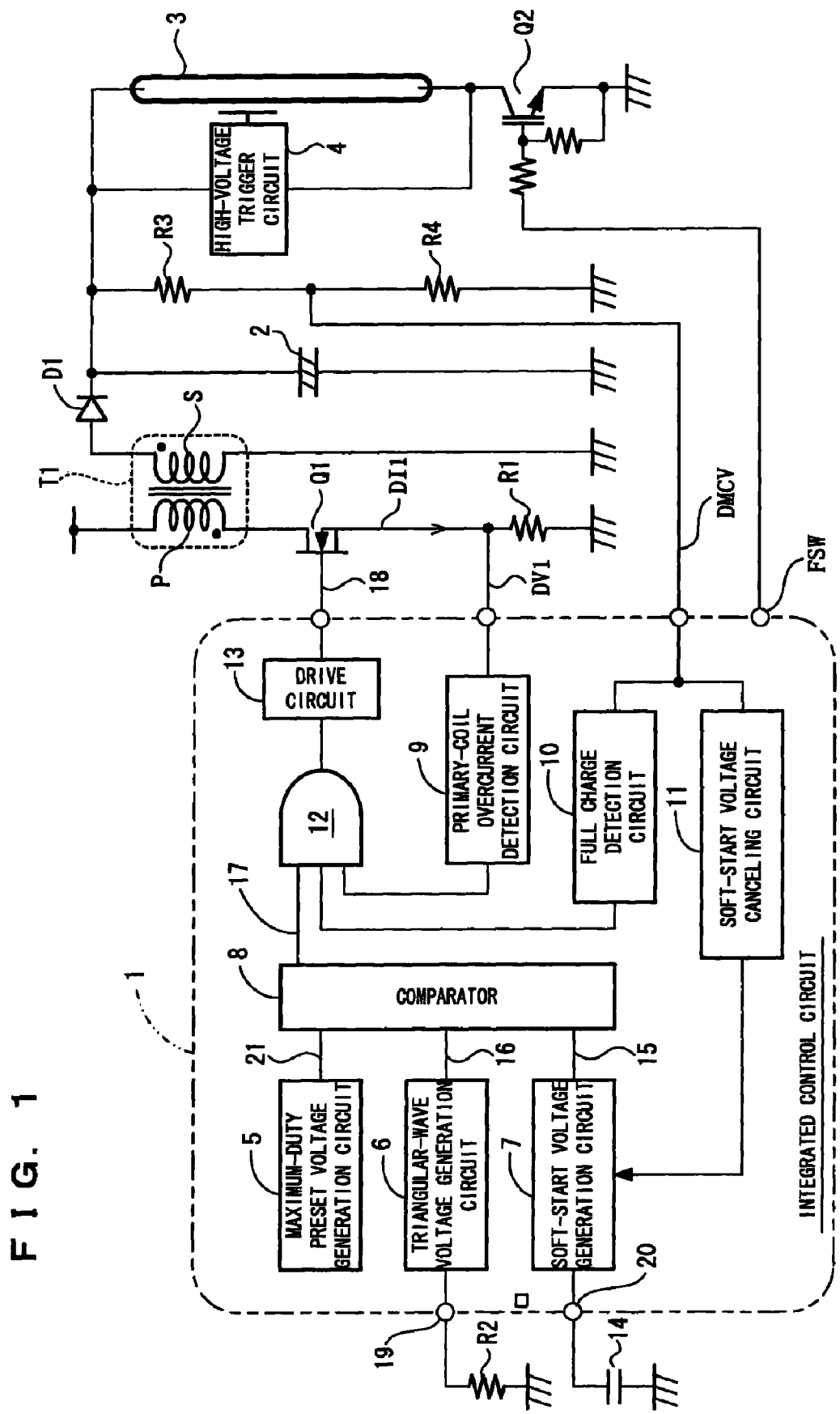
FIG. 1 is a diagram illustrating a configuration of a discharge device according to Embodiment 1 of the invention.

FIG. 1 is a circuit block diagram illustrating a configuration of the strobe apparatus which is one type of the discharge devices according to Embodiment 1. In the strobe apparatus, a field effect transistor (FET) Q1 is connected in series with a primary side coil P of an oscillation transformer T1, and a switching operation and the like of the transistor Q1 are controlled by an integrated control circuit device 1. A main capacitor 2 is connected in parallel with a secondary side coil S of the oscillation transformer T1 via a diode D1. A series circuit between a xenon tube 3 and an insulated gate bipolar transistor Q2 is connected in parallel with the main capacitor 2. R1 is a resistor for detecting current that flows in the primary side coil P of the oscillation transformer T1, R3 and R4 are resistors for detecting voltage charged in the main capacitor 2, and 4 is a high-voltage trigger circuit for generating high-voltage pulse so as to activate the xenon tube 3.

The integrated control circuit device 1 as a pulse width control circuit for controlling charging and emitting operations of the strobe is designed as an application specific integrated circuit. The integrated control circuit device 1 is formed as an integrated circuit including a maximum-duty preset voltage generation circuit 5, a triangular-wave voltage generation circuit 6, a soft-start voltage generation circuit 7, a comparator 8, a primary-coil overcurrent detection circuit 9 for detecting that overcurrent flows in the primary side coil P of the oscillation transformer T1, a full charge detection circuit 10 for detecting a charging termination, a soft-start voltage canceling circuit 11 for canceling a soft start operation by detecting that a terminal voltage of the main capacitor 2 is charged to a predetermined voltage value on the basis of an increase of a divided voltage of the resistors R3 and R4 to a preset voltage and rapidly increasing the soft-start voltage, an AND gate 12, and a drive circuit 13 for driving the field effect transistor Q1.

In addition, a resistor 2 as a time-constant determining element for setting a frequency of a triangular wave generated by the triangular-wave voltage generation circuit 6, a capacitor 14 as a time-constant determining element for setting a rising curve of the soft-start voltage generated by the soft-start voltage generation circuit 7 are provided outside the integrated control circuit device 1 so as to be connected to the triangular-wave voltage generation circuit 6, and the soft-start voltage generation circuit 7 via external connection terminals 19 and 20.

Figure 2:
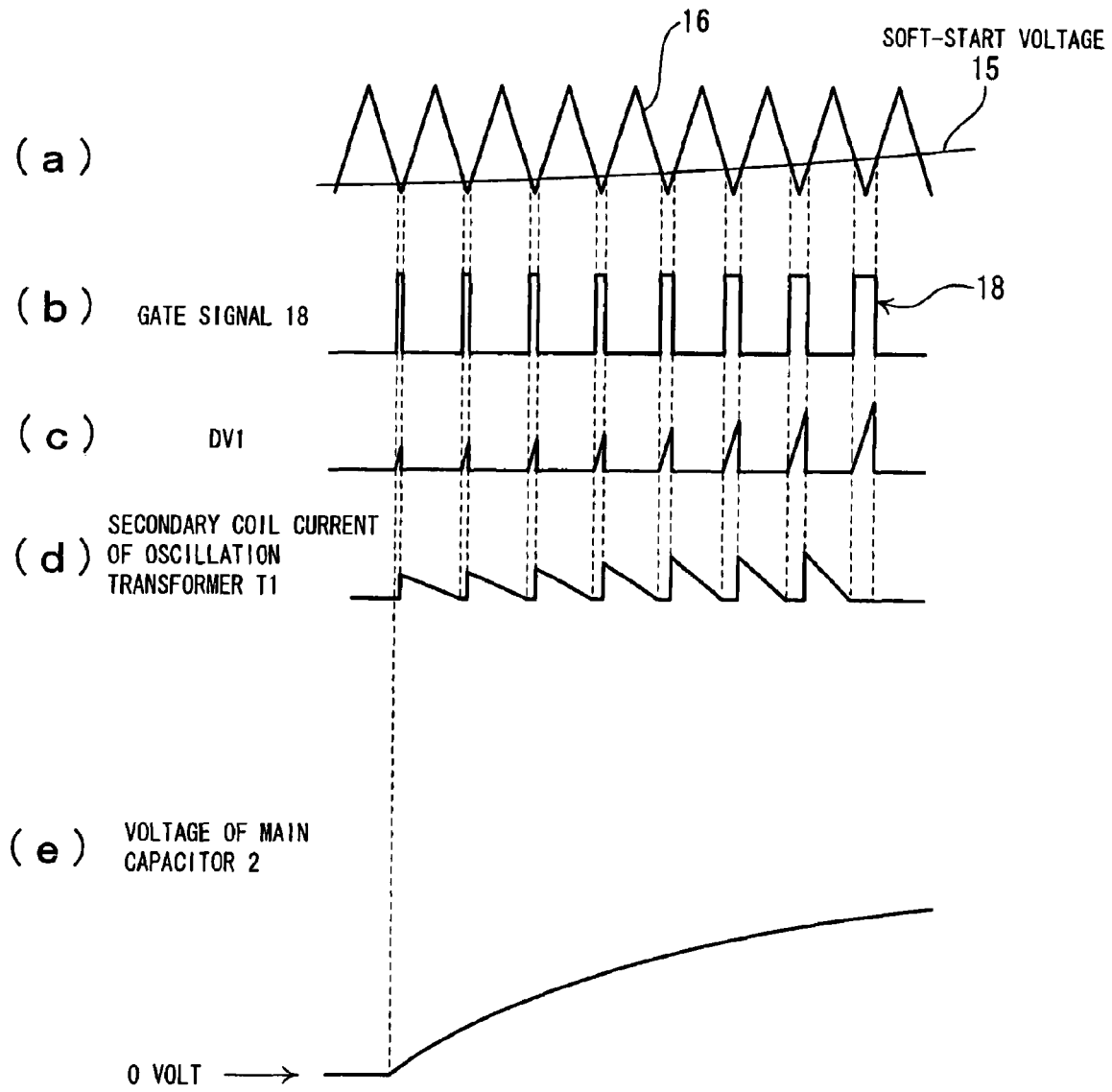
FIG. 2 is a diagram illustrating waveforms of principal portions directly after a power source is applied according to Embodiment 1.
Figure 3:
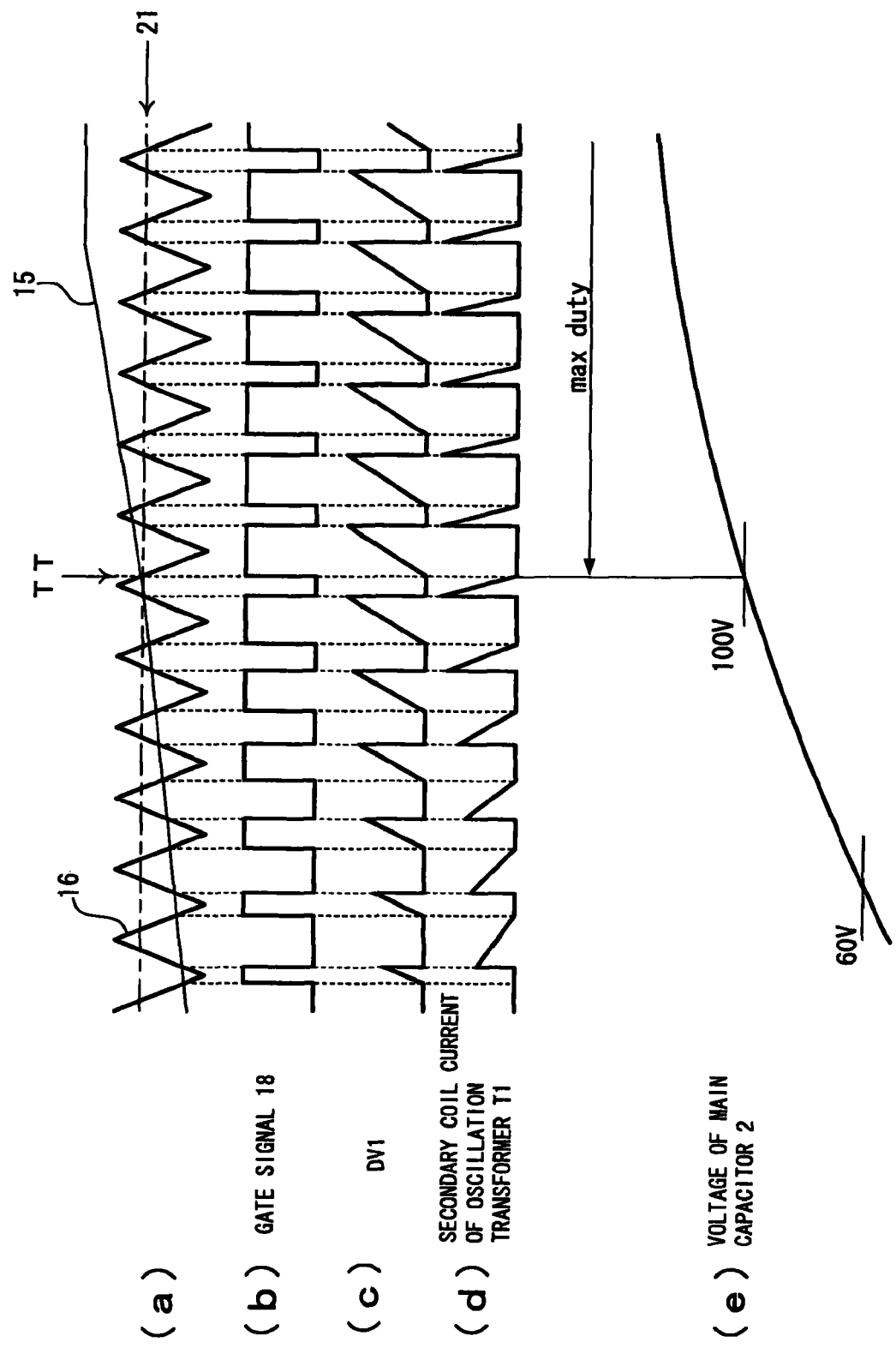
FIG. 3 is a diagram illustrating waveforms of the principal portions in a middle voltage state of Embodiment 1.
Figure 4:
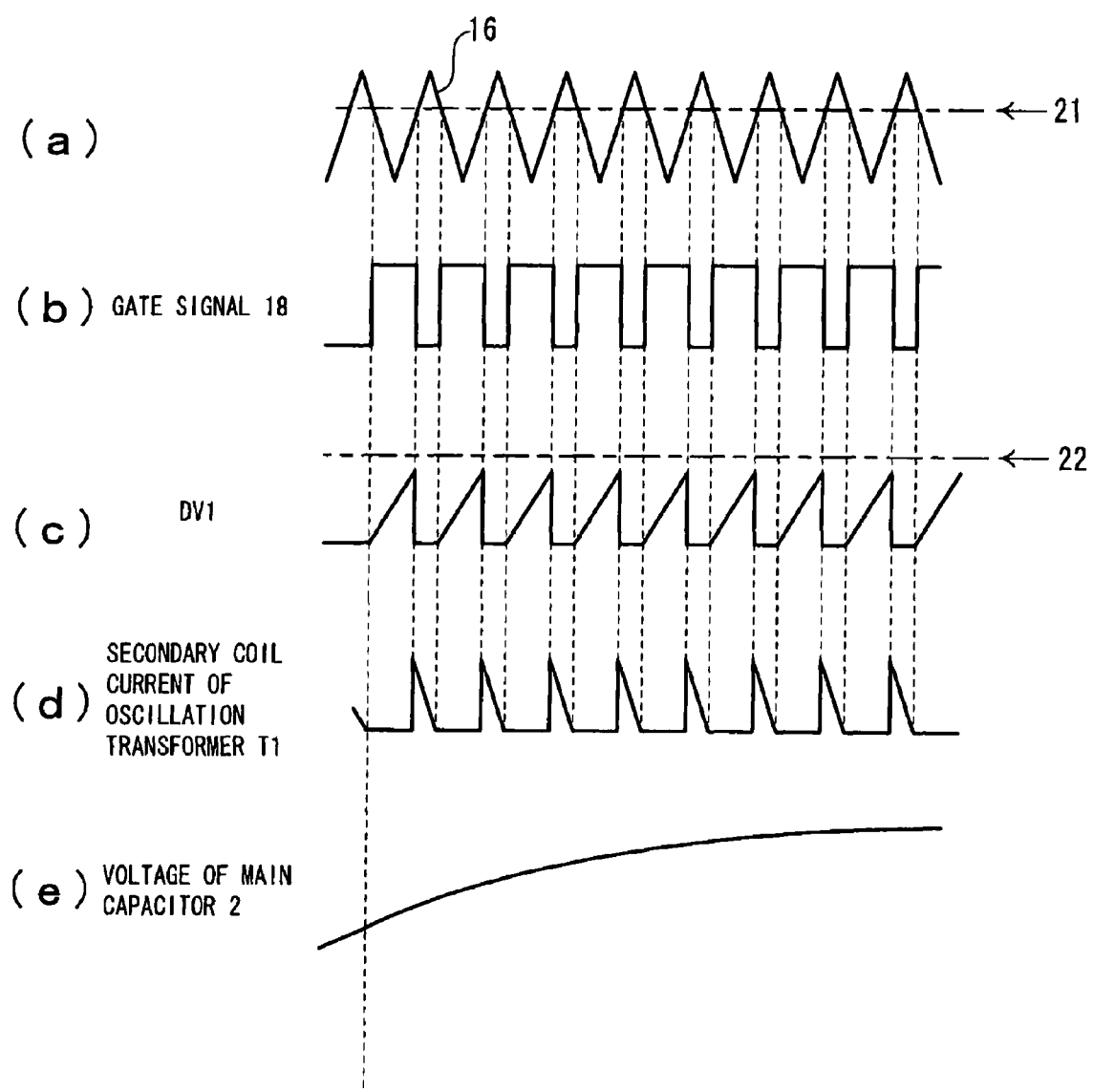
FIG. 4 is a diagram illustrating waveforms of the principal portions in a high voltage state of Embodiment 1.

FIGS. 2 and 3 show an initial charging condition directly after the power source is turned on, in detail, FIG. 2 shows a timing chart in a state where the terminal voltage of the main capacitor 2 is being charged until zero volt reaches a low voltage, and FIG. 3 shows a timing chart in a condition of a middle voltage. FIG. 4 shows a timing chart in a state of being charged until a high voltage. In FIG. 4($d$), the current in the secondary side coil S of the oscillation transformer T1 continuously flows until a rising timing of a gate signal 18 to the next "H" level. However, practically, the current does not flow at the time point, which is earlier than the rising timing to the next "H" level, as early as a time depending on the terminal voltage of the main capacitor 2.

When the power source is applied, the soft-start voltage generation circuit 7 charging a capacitor 14 with constant current outputs a soft-start voltage 15 that linearly increases in accordance with elapsed time as shown in FIG. 2($a$).

The comparator 8 outputs a level-determination signal 17 of logic level "H" or "L" by comparing the soft-start voltage 15 with a triangular-wave voltage 16, which has a constant frequency (here, for example, 600 kHz), generated by the triangular-wave voltage generation circuit 6. Specifically, the charging operation of the main capacitor 2 is not terminated in the initial charging condition. Hence, output of the full charge detection circuit 10 is maintained in the state of the logic level "H", and the overcurrent does not flow in the primary side coil P of the oscillation transformer T1. Output of the primary-coil overcurrent detection circuit 9 is maintained in the state of the logic level "H", and the AND gate 12 is switched by only the level-determination signal 17 of the comparator 8. The gate signal 18 of the logic level "H" is applied to the gate of the transistor Q1 via the drive circuit 13 during a period in which the triangular-wave voltage 16 is lower than the soft-start voltage 15 as shown in FIG. 2(*b*).

Accordingly, primary current D11 flows in the primary side coil P of the oscillation transformer T1 in accordance with the period in which the gate signal 18 is generated. In accordance with this, a terminal voltage DV1 of the resistor R1 gradually increases as the conduction period gradually increases as shown in FIG. 2(*c*). In this case, the conduction period of the gate signal 18 is short, so that the terminal voltage DV1 of the resistor R1 is lower than the primary coil overcurrent preset voltage that is set in accordance with a terminal voltage DV1 of the resistor R1 when overcurrent flows in the primary coil. Hence, the output of the primary-coil overcurrent detection circuit 9 is maintained in the state of logic level "H".

The transistor Q1 is driven by a PWM pulse, and thus charging current flows in a charging circuit of the main capacitor 2 of the secondary side coil S of the oscillation transformer T1 as shown in FIG. 2(*d*). Accordingly, the main capacitor 2 is gradually charged, and the terminal voltage increases in a gentle curve as shown in FIG. 2(*e*).

The soft-start voltage canceling circuit 11 detects that the terminal voltage of the main capacitor 2 increases to the preset middle voltage (that is, 100 volt which is the terminal voltage of the main capacitor 2) from the divided voltage DMCV of the resistors R3 and R4. Until that time, as the first half part of the graphs shown in FIGS. 2 and 3, the PWM soft start determined by the level-determination signal 17 obtained by comparing the soft-start voltage 15 with the triangular-wave voltage 16 by the comparator 8 that increases the conduction period of the gate signal 18. Therefore, overcurrent does not occur even in a case of a drive at high frequency which is 600 kHz.

In addition, in order to prevent the overcurrent in the initial charging condition directly after the power source is turned on, it is considered that a separately-excited DC-DC converter is driven at the low frequency which is several tens of kilohertz, but, in this case, a ripple occurs in the power source line. Particularly, in a case of a strobe apparatus of a mobile phone having a camera mounted therein, when a low frequency ripple occurs in the power source line, there have been problems that a phone call is disconnected or the voice of the phone call is hard to hear, and when a low frequency drive is performed, there has been a problem that a decrease in circuit size is difficult since it is required to reduce line noise in the mobile phone in a way that a large inductor is inserted in the power source line in order to maintain speech quality. However, in the same method of the embodiment, a separately-excited DC-DC converter is driven by the high frequency drive, and thus the ripple in the power source line does not occur. When the low frequency drive is performed by such a method, it is possible to maintain speech quality without using a large inductor that requires a mounting operation. Moreover, the PWM soft start is performed even in the case of the high frequency drive, and thus it is possible to surely prevent occurrence of the overcurrent.

The soft-start voltage canceling circuit 11 detects that the terminal voltage of the main capacitor 2 increases to the preset middle voltage (that is, 100 volt which is the terminal voltage of the main capacitor 2) from the divided voltage DMCV of the resistors R3 and R4, at a timing TT. Then, as shown in FIG. 3(*a*), the soft-start voltage 15 of the soft-start voltage generation circuit 7 is forcedly changed to the state driven by the gate signal 18 of the maximum duty (ON time 0.75, OFF time 0.25) that is determined by the triangular-wave voltage 16 and the preset voltage of the maximum-duty preset voltage generation circuit 5. Therefore, it is possible to realize a high efficiency charging as compared with the case where the soft start is continuously performed in accordance with a gradient determined by the capacitor 14 until completion of charging the main capacitor 2.

Figure 6:
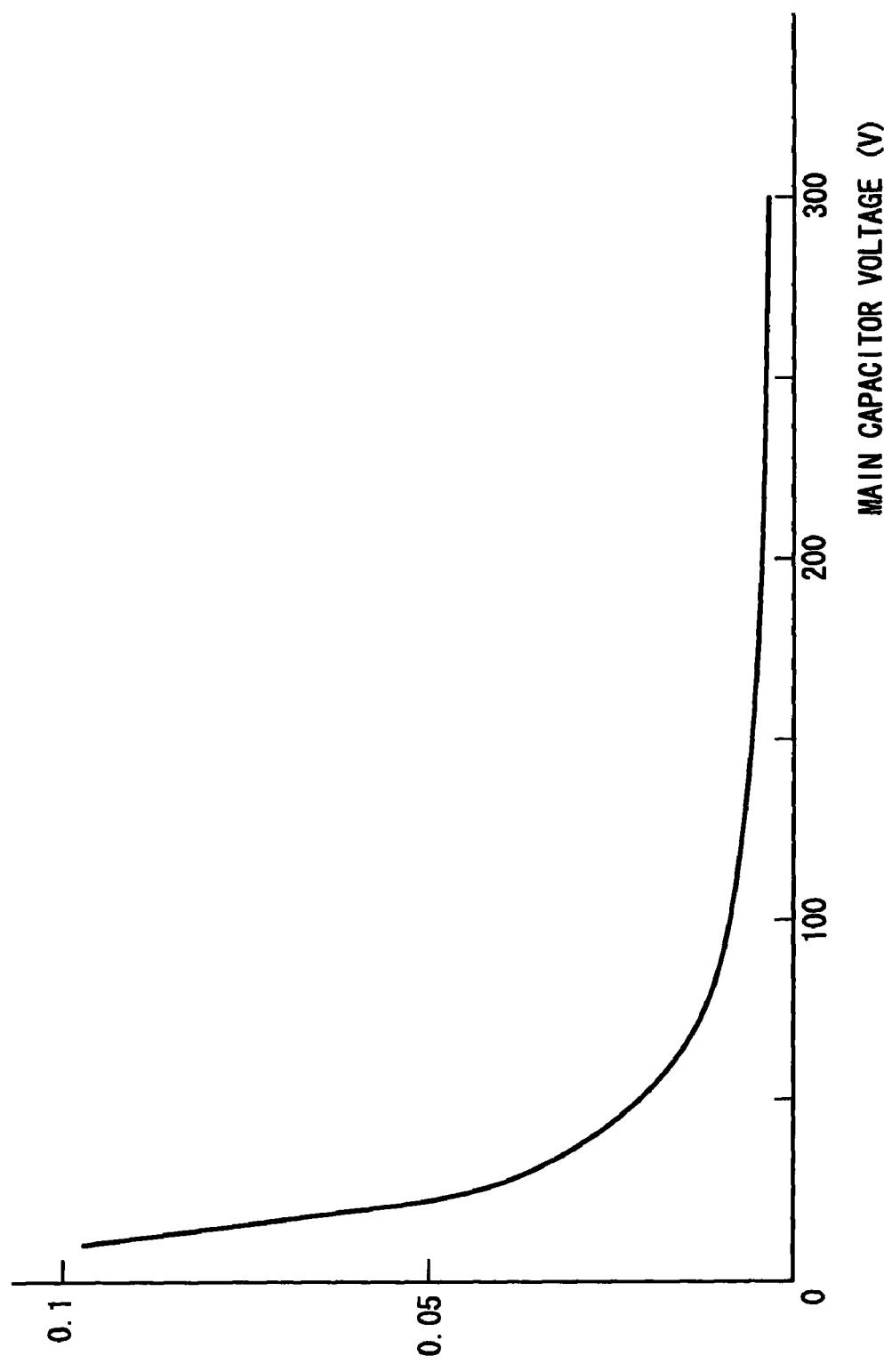
FIG. 6 is a diagram illustrating relationship between a terminal voltage of a main capacitor 2 and a secondary-side discharging time coefficient according to Embodiment 1.

Here, the preset middle voltage (100 volt terminal voltage of the main capacitor 2) is defined as a voltage at which the overcurrent does not occur even when changing to the drive of the gate signal 18 at the maximum duty, and the preset middle voltage is around 100 volt when a terminal voltage of the main capacitor 2 fully charged is 300 volt or so. In FIG. 6, the horizontal axis shows the terminal voltage of the main capacitor 2, the vertical axis shows the secondary-side discharging time coefficient, and the terminal voltage of the main capacitor 2 has a rising gradient become gentle suddenly in the vicinity of 100 volt even when the conduction period in the oscillation transformer T1 increases.

In FIG. 3, after the timing TT, it is performed to forcedly change to the state driven by the gate signal 18 of the maximum duty that is determined by the triangular-wave voltage 16 and the preset voltage of the maximum-duty preset voltage generation circuit 5. However, the changing can be implemented by a method of performing the charging operation by widening the pulse width of the terminal voltage DV1 of the resistor R1 to the maximum pulse width determined by a peak current that makes to reach the preset voltage 22 of the primary-coil overcurrent detection circuit 9.

In the embodiment as shown in FIGS. 3 and 4, after forcedly changing to the state driven by the gate signal 18 of the maximum duty that is determined by the triangular-wave voltage 16 and the preset voltage 21 of the maximum-duty preset voltage generation circuit 5, the occurrence of the overcurrent is surely prevented by turning off the AND gate 12 when the peak current is detected by the primary-coil overcurrent detection circuit 9.

In addition, the full charge detection circuit 10 detects the charging termination from an increase of the charging voltage, and the charging operation is terminated by turning off the AND gate 12.

When a strobe is needed for a photographing in the fully charged state, a signal of "H" level is outputted from a terminal FSW, the transistor Q2 is turned on, a high voltage pulse of several kilovolts is outputted from the high-voltage trigger circuit 4, and the xenon tube 3 emits light by excitation thereof.

The pulse width outputted form the terminal FSW varies with a photographing condition. For example, when a subject for photography is close or reflectance of the subject is high, an operation of emitting a small amount of light is performed by narrowing the pulse width. Conversely, when a subject for photography is far or reflectance of the subject is low, an operation of emitting a large amount of light is performed by widening the pulse width. A residual voltage of the main capacitor 2 varies with light amount at the time of the emitting operation.

In addition, in a recharging operation after the emitting operation, it is remarkably effective to change to the maximum duty when the terminal voltage of the main capacitor 2 reaches 100 volt which is the middle voltage.

Figure 5:
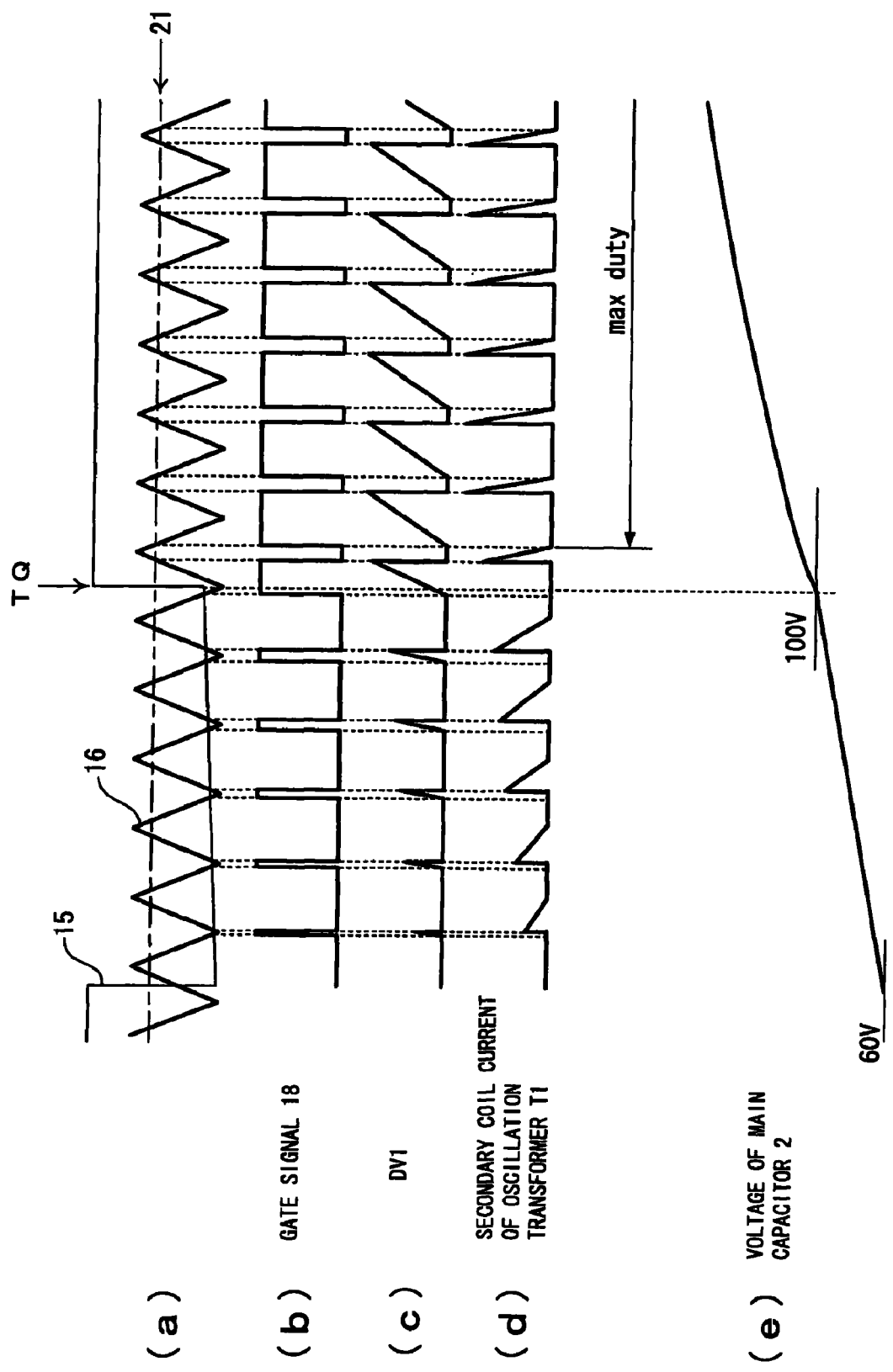
FIG. 5 is a diagram illustrating waveforms of the principal portions in a recharging state after a photographing operation according to Embodiment 1.

Specifically, as shown in FIG. 5, the residual voltage of the main capacitor 2 is less than the middle voltage (100 volt terminal voltage of the main capacitor 2) that is set in the soft-start voltage canceling circuit 11. In this case, the integrated control circuit device 1 charges the capacitor 14 with constant current after rapidly discharging the capacitor 14. Therefore, the soft-start voltage that linearly increases in accordance with time elapse is generated, the narrow pulse width gradually increases as shown in FIG. 2, and thus the inrush current caused by magnetic saturation is suppressed, so that the charging operation is efficiently performed. However, when the residual voltage of the main capacitor 2 is about 60 volt as shown in FIG. 5, the terminal voltage of the main capacitor 2 reaches 100 volt at a time point (timing TQ in FIG. 5) earlier than the case of the charging operation directly after the power source is turned on as shown in FIG. 2. Therefore, the charging efficiency decreases when the charging is continuously performed by widening the narrow pulse width in accordance with the soft-start voltage 15 based on the capacitor 14. In the embodiment, by detecting that the terminal voltage of the main capacitor 2 reaches 100 volt which is the middle voltage and converting to the maximum duty, the main capacitor 2 is charged. As a result, it can be found that the main capacitor 2 can be fully charged in a short time.

As described above, the main capacitor 2 is efficiently charged while overcurrent is prevented by the high frequency drive, and the PWM soft start is controlled by comparing the soft-start voltage 15 generated by the soft-start voltage generation circuit 7 with the triangular-wave voltage 16 generated by the triangular-wave voltage generation circuit 6. Hence, when it is necessary to change the driving frequency, the inductance of the oscillation transformer T1, or the like, it is possible to appropriately deal with that in a way of changing the resistor R2 and the capacitor 14 which are provided outside the integrated control circuit device 1. In addition, when it is necessary to change the driving frequency or the inductance of the oscillation transformer T1 in a case where the same PWM soft start is implemented by the micro computer without comparing the soft-start voltage 15 generated by the soft-start voltage generation circuit 7 with the triangular-wave voltage 16 generated by the triangular-wave voltage generation circuit 6, a complicated operation is required since it is necessary to store in the micro computer a correlation table of the pulse width of the proper PWM drive corresponding to the main capacitor voltage for each time. However, according to the above-described configuration in the embodiment, it is possible to promptly deal with the change of the driving frequency or the inductance of the transformer. In addition, it is possible to deal with the change by just changing the resistor R2 and the capacitor 14 provided outside the integrated control circuit device 1. Therefore, it is possible to use the integrated control circuit device for plural types of devices without forming the integrated control circuit devices for every type having a different driving frequency or a different inductance of the oscillation transformer.

In addition, according to the embodiment, the primary-coil overcurrent detection circuit 9 is provided on the integrated control circuit device 1, but this may be omitted.

In addition, according to the embodiments, both of the resistor R2 and the capacitor 14 are provided outside the integrated control circuit device 1, but any one of the resistor R2 and the capacitor 14 may be provided outside the integrated control circuit device 1.

Embodiment 2

Next, a discharge device according to Embodiment 2 of the invention will be described.

Figure 7:
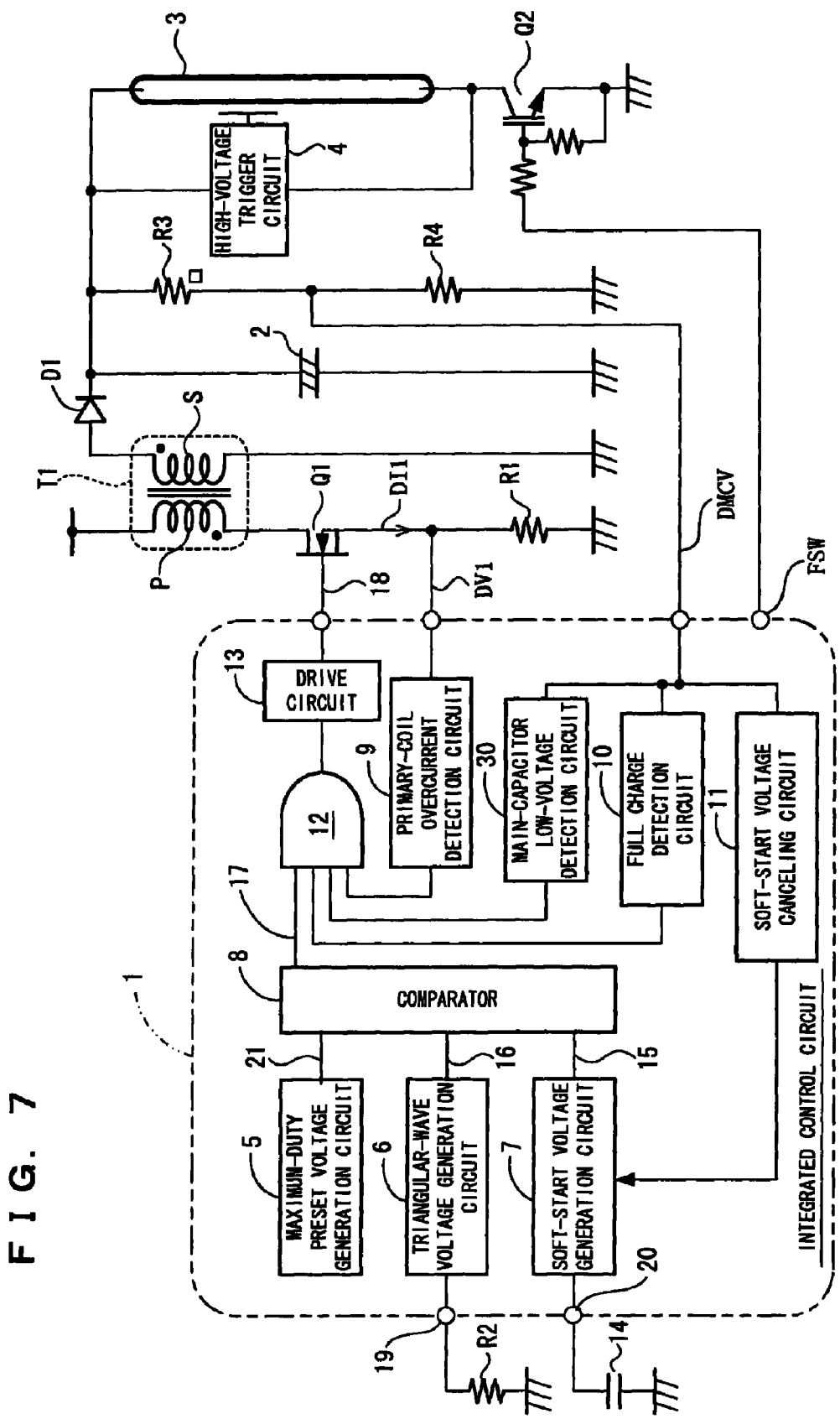
FIG. 7 is a diagram illustrating a configuration of a discharge device according to Embodiment 2 of the invention.

FIG. 7 is a circuit block diagram illustrating a configuration of the strobe apparatus which is one type of the discharge devices according to Embodiment 2. In the strobe apparatus as shown in FIG. 7, a field effect transistor (FET) Q1 is connected in series with a primary side coil P of an oscillation transformer T1, and a switching operation and the like of the transistor Q1 are controlled by an integrated control circuit device 1. A main capacitor 2 is connected in parallel with a secondary side coil S of the oscillation transformer T1 via a diode D1. A series circuit between a xenon tube 3 and an insulated gate bipolar transistor Q2 is connected in parallel with the main capacitor 2. R1 is a resistor for detecting current that flows in the primary side coil P of the oscillation transformer T1, R3 and R4 are resistors for detecting voltage charged in the main capacitor 2, and 4 is a high-voltage trigger circuit for generating high-voltage pulse so as to activate the xenon tube 3.

The integrated control circuit device 1 as a pulse width control circuit for controlling charging and emitting operations of the strobe is formed as an integrated circuit including a maximum-duty preset voltage generation circuit 5, a triangular-wave voltage generation circuit 6, a soft-start voltage generation circuit 7, a comparator 8, a primary-coil overcurrent detection circuit 9 for detecting that overcurrent flows in the primary side coil P of the oscillation transformer T1, a full charge detection circuit 10 for detecting a charging termination, a soft-start voltage canceling circuit 11 for canceling a soft start operation by detecting that a terminal voltage of the main capacitor 2 is charged to a predetermined voltage value on the basis of an increase of a divided voltage of the resistors R3 and R4 to a preset voltage and rapidly increasing the soft-start voltage, a main-capacitor low-voltage detection circuit 30 for outputting a control signal in order to protect a circuit when it is not possible to charge the main capacitor 2 and the like which are in an overload condition caused by, for example, a short of a terminal and the like, an AND gate 12, and a drive circuit 13 for driving the field effect transistor Q1.

In addition, a resistor R2 as a time-constant determining element for setting a frequency of a triangular wave generated by the triangular-wave voltage generation circuit 6, and a capacitor 14 as a time-constant determining element for setting a rising curve of the soft-start voltage generated by the soft-start voltage generation circuit 7 are provided outside the integrated control circuit device 1 so as to be connected to the triangular-wave voltage generation circuit 6, and the soft-start voltage generation circuit 7 via the external connection terminals 19 and 20.

In the strobe apparatus serving as the discharge device according to Embodiment 2 configured as described above, normal charging and emitting operations are the same as Embodiment 1, and thus the description thereof will be omitted here.

Hereinafter, a description will be given of a charging operation in a case where an overload condition caused by a short circuit generated by some factors occurs temporally during a period in an output portion, such as the main capacitor 2 and the like, of a DC/DC converter that is a power source for emitting the xenon tube 3.

Figure 8:
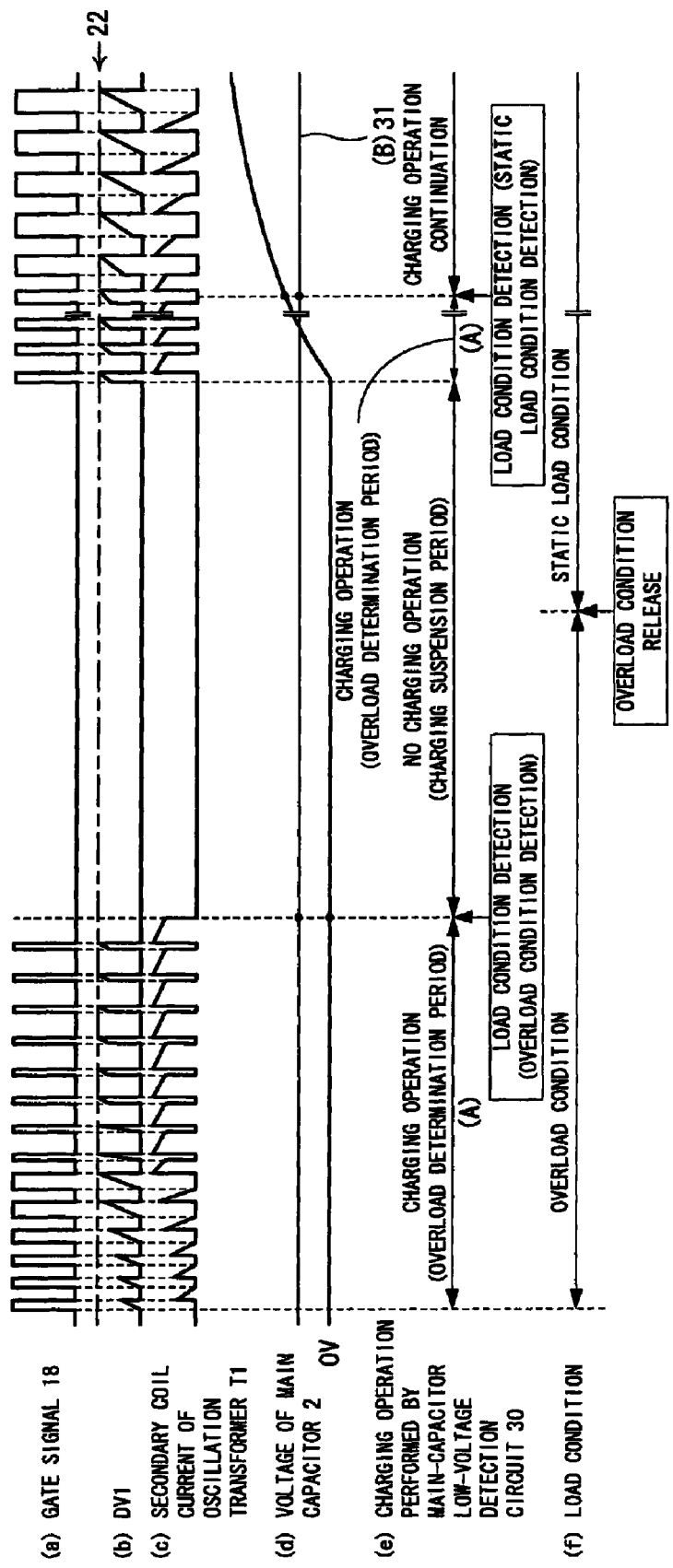
FIG. 8 is a diagram illustrating waveforms of principal portions and a timing chart (1) in an overload condition according to Embodiment 2.

In order to implement an operation capable of dealing with the case where an overload condition occurs temporally during a period in the output portion of the DC/DC converter as mentioned above, the main-capacitor low-voltage detection circuit 30 is provided as shown in FIG. 7. In the main-capacitor low-voltage detection circuit 30, a predetermined overload detection voltage (B) 31 which is a reference voltage for comparing with a charging voltage of the main capacitor 2 is preset in order to detect that the converter output is in the overload condition with reference to the charging voltage of the main capacitor 2 as shown in FIG. 8. Additionally, the strobe apparatus may be configured such that the overload detection voltage (B) 31 is set and stored in an outer portion of the main-capacitor low-voltage detection circuit 30.

First, in the main-capacitor low-voltage detection circuit 30, a description will be given of the charging operation in the case where a power source is applied when the output portion of the DC/DC converter is already in the overload condition.

FIG. 8 is a timing chart in the overload condition and shows an operation when the power source is applied in an output overload condition.

As shown in FIG. 8, the strobe apparatus starts the charging operation of the main capacitor 2 by outputting the gate signal 18 as a converter drive signal from the drive circuit 13 when the power source is applied. Then, in the main-capacitor low-voltage detection circuit 30, when the charging voltage of the main capacitor 2 does not reach the predetermined overload detection voltage (B)31 even though the charging operation is continuously performed during a predetermined constant time (A) as an overload determination period, the circuit judges that the converter output is in the overload condition caused by the short circuit and the like and outputs a control signal to the AND gate 12 so as to terminate the charging operation by setting the predetermined constant time as a charging suspension period. Then, in the main-capacitor low-voltage detection circuit 30, when the charging voltage of the main capacitor 2 does not reach the predetermined overload detection voltage (B)31 in the case where the charging operation is started again and continuously performed during the predetermined constant time (A) as the overload determination period, the circuit judges that the converter output is still in the overload condition, so that the control signal is outputted to the AND gate 12 so as to terminate again the charging operation by setting the predetermined constant time as a charging suspension period. As described above, in the main-capacitor low-voltage detection circuit 30, the control signal is outputted to the AND gate 12 so as to repeat the cycle of the charging operation and the no-charging operation, as long as the overload condition of the converter output continues.

Meanwhile, in the main-capacitor low-voltage detection circuit 30, for example, when the overload condition of the converter output is released during the charging operation being stopped, the charging operation is started again after the charging operation is terminated by setting the predetermined constant time as the charging suspension period, and the charging operation is continuously performed during the predetermined constant time (A) as the overload determination period, so that the charging voltage of the main capacitor 2 exceeds the predetermined overload detection voltage (B)31. In that case, the main-capacitor low-voltage detection circuit 30 judges that the converter output is in the static load condition and outputs the control signal to the AND gate 12 so as to continuously perform the same charging operation as a normal charging operation.

Next, in the main-capacitor low-voltage detection circuit 30, a description will be given of a charging operation in a case where the output portion of the DC/DC converter is in the overload condition when the main capacitor 2 is in the state of charging determination.

Figure 9:
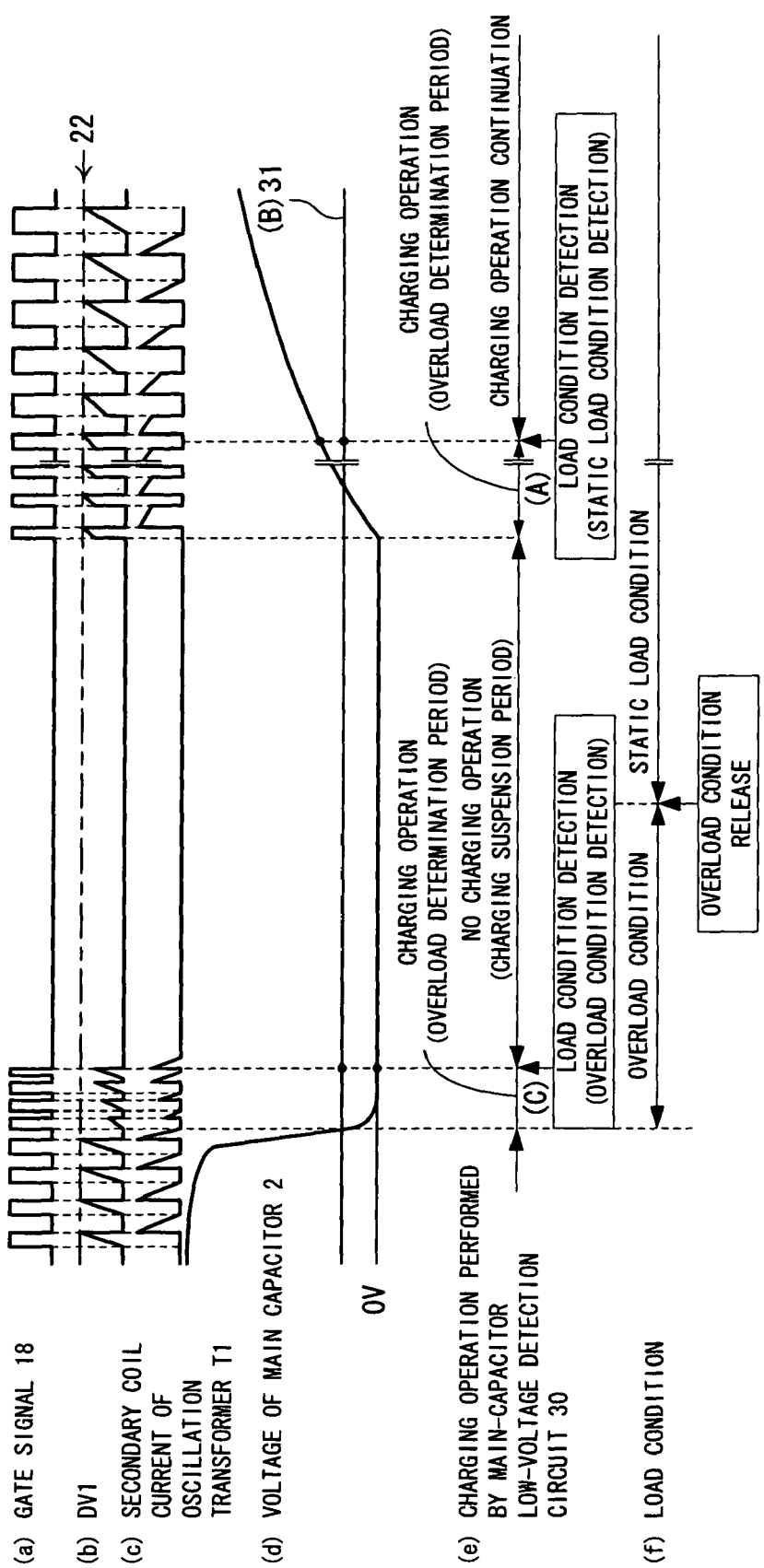
FIG. 9 is a diagram illustrating waveforms of the principal portions and a timing chart (2) in the overload condition according to Embodiment 2.

FIG. 9 is a timing chart in the overload condition and shows an operation at the time of an output overload in the state of the charging determination.

In the main-capacitor low-voltage detection circuit 30 of the strobe apparatus as shown in FIG. 9, when the charging voltage of the main capacitor 2 rapidly becomes equal to or lower than the overload detection voltage (B)31 in response to some factors and the state continues for more than a predetermined constant time (C) as the overload determination period even though the charging operation is continuously performed, the circuit judges that the converter output is in the overload condition caused by the short circuit and the like and outputs a control signal to the AND gate 12 so as to terminate the charging operation by setting the predetermined constant time as a charging suspension period. Then, in the main-capacitor low-voltage detection circuit 30, when the charging voltage of the main capacitor 2 does not reach the predetermined overload detection voltage (B)31 in the case where the charging operation is started again and continuously performed during the predetermined constant time (A) as the overload determination period, the circuit judges that the converter output is still in the overload condition and outputs the control signal to the AND gate 12 so as to terminate again the charging operation by setting the predetermined constant time as a charging suspension period. As described above, in the main-capacitor low-voltage detection circuit 30, the control signal is outputted to the AND gate 12 so as to repeat the cycle of the charging operation and the no-charging operation, as long as the overload condition of the converter output continues. The above-described operation is an intermittent operation due to determination of the overload condition.

Meanwhile, in the main-capacitor low-voltage detection circuit 30, for example, when the overload condition of the converter output is released during the charging operation being stopped, the charging operation is started again after the charging operation is terminated by setting the predetermined constant time as the charging suspension period, and the charging operation is continuously performed during the predetermined constant time (A) as the overload determination period, so that the charging voltage of the main capacitor 2 exceeds the predetermined overload detection voltage (B)31. In that case, the main-capacitor low-voltage detection circuit 30 judges that the converter output is in the static load condition and outputs the control signal to the AND gate 12 so as to continuously perform the same charging operation as a normal charging operation.

In addition, in the main-capacitor low-voltage detection circuit 30, charging operation time (A or C: overload determination period) for determining whether the output portion of the DC/DC converter is in the overload condition is set at an excessively short time by setting a low overload detection voltage (B)31, and then a ratio between predetermined times of the charging operation and the no-charging operation is set so that the no-charging operation time (charging suspension period) is sufficiently longer than the charging operation time.

The predetermined time (A) varies inversely with an oscillation frequency of the triangular-wave voltage generation circuit 6, that is, varies as a resistance of the resistor R2. The predetermined time (A) is set at a minimum necessary time in order that a voltage of the main capacitor 2 previously reaches a voltage by which it can be determined that the voltage of the capacitor 2 is in a stationary condition as compared with the predetermined overload detection voltage (B)31, when the load condition is stationary on the basis of the result of a simulation by using a threshold of the charging efficiency of the main capacitor 2, the charging voltage of the main capacitor 2, capacity of the main capacitor 2, and the power source voltage and current. In a measurement condition as shown in FIG. 10, a oscillation frequency of the triangular-wave voltage generation circuit 6 is set at 600 KHz, but this frequency is set for a case of using the main capacitor 2 (which is mostly used for mobile phones) having a small capacity (about 50° F. or less). When the main capacitor 2 having a large capacity is used, the frequency is lowered, and thus the main capacitor 2 is used for a long time as the predetermined time (A).

In addition, the predetermined voltage (B) is set in consideration of a condition as mentioned below. Specifically, the main capacitor voltage after the emitting operation of the strobe is usually lowered to about 40 to 50V (which is a final voltage of the emitting operation performed by the xenon tube, that is, a minimum voltage capable of continuing a discharging operation). In addition, an aluminum electrolysis capacitor used in the main capacitor 2 may cause a transient recovery voltage of about 10V in response to polarizing action even after completely discharging in a state where a short circuit occurs in the terminal. Accordingly, the voltage of the main capacitor 2 in the overload condition is set at a voltage greater than the transient recovery voltage in a short-circuited condition of the main capacitor 2 and lower than a voltage after the emitting in the static load condition. That is, the voltage of the main capacitor 2 is set at a value selected in the range of 10 to 40V.

In addition, in a case where the voltage of the main capacitor 2 is precipitously lowered from a stationary state of charging termination, for example, a load condition becomes the overload, the strobe is emitted in the static load condition, and so on, there is a clear reason why the load condition is changed with respect to the precipitous decrease of the voltage of the main capacitor 2. Therefore, although there is no problem even when the predetermined time (C) is sufficiently shorter than the predetermined time (A), as the overload determination period for detecting the load condition (or the overload condition), the predetermined time (C) may be set to the same time as the predetermined time (A) for a precise result of detection of the load condition and the same reason as in the case of the predetermined time (A). However, in order not to misjudge the load condition, at least 1 ms or more time is necessary.

In addition, in the predetermined time rate, time of the charging suspension period may be set at a minimum time required for being in the thermal range of preventing components from being damaged or destructed due to heat generation during an operation of the strobe apparatus, after drive of the strobe apparatus is started by turning on the power source. Specifically, the heat generation decreases as this time increases, and so low energy consumption can be expected, but it should be considered that operation efficiency in this case is lowered since it takes a time until the charging operation is started even after the overload condition is released.

As described above, according to the embodiment, for example, in consideration of the measurement condition and the measurement result data based on an experiment as shown in FIG. 10, predetermined values are set such that the predetermined time (A) in the charging operation is about 250 milli-second (ms) as shown in FIG. 8, the predetermined voltage (B) of an overload detection voltage 31 is about 20 volt (V) as shown in FIGS. 8 and 9, the predetermined time (C) in the charging operation is about 10 milli-second (mS) as shown in FIG. 9, and the predetermined time rate between the charging operation and the no-charging operation is substantially in proportion of one to eight or more.

With such a configuration, the charging current of the main capacitor 2 can be suppressed by the primary-coil overcurrent detection circuit 9 at the time of the overload such as a short circuit of the main capacitor 2.

In addition, in a case where the charging voltage of the main capacitor 2 does not reach the predetermined voltage after a predetermined time elapsed from start of the charging operation, the main-capacitor low-voltage detection circuit 30 performs the pulse width control by determining that the main capacitor 2 is in the overload condition and by using the intermittent drive that alternately performs the charging operation and the no-charging operation for the main capacitor 2 on the basis of the predetermined time rate.

In addition, in a case where the charging voltage of the main capacitor 2 is the predetermined voltage or less, the charging operation is restarted, and the charging voltage of the main capacitor 2 does not reach the predetermined voltage after a predetermined time elapsed when the charging operation is terminated, the main-capacitor low-voltage detection circuit 30 performs the pulse width control by determining that the main capacitor 2 is in the overload condition and by using the intermittent drive that alternately performs the charging operation and the no-charging operation for the main capacitor 2 on the basis of the predetermined time rate.

As a result, it is possible to decrease the size of the configuration, and it is also possible to protect the circuit element against the heat generation caused by the overcurrent, even when the main capacitor 2 is in the overload condition such as a short circuit in the case where the drive is performed by using not only a low frequency but also a high frequency.

Embodiment 3

Next, a discharge device according to Embodiment 3 of the invention will be described.

Figure 11:
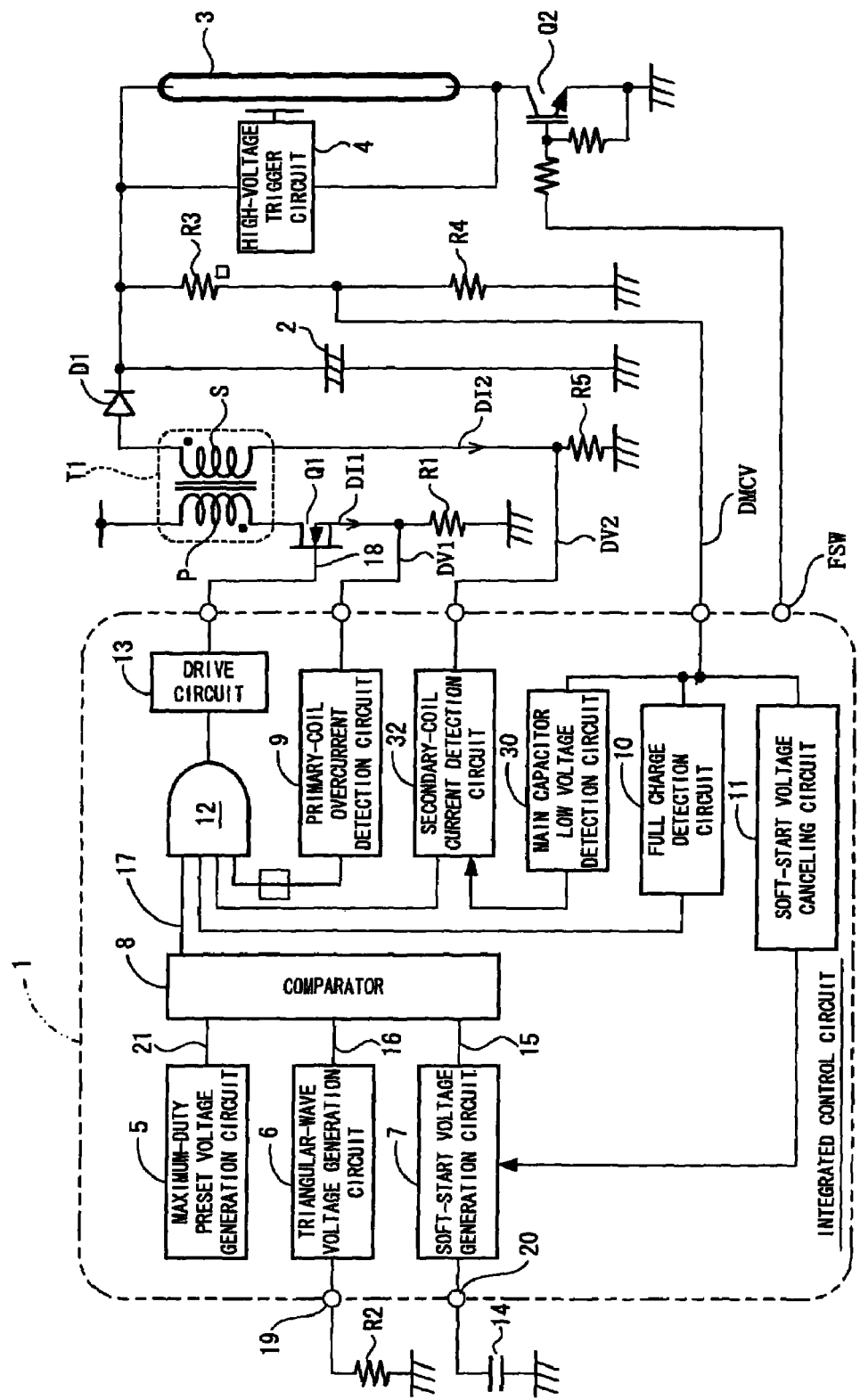
FIG. 11 is a diagram illustrating a configuration of a discharge device according to Embodiment 3 of the invention.

FIG. 11 is a circuit block diagram illustrating a configuration of the strobe apparatus which is one type of the discharge devices according to Embodiment 3. In the strobe apparatus as shown in FIG. 11, a field effect transistor (FET) Q1 is connected in series with a primary side coil P of an oscillation transformer T1, and a switching operation and the like of the transistor Q1 are controlled by an integrated control circuit device 1. A main capacitor 2 is connected in parallel with a secondary side coil S of the oscillation transformer T1 via a diode D1. A series circuit between a xenon tube 3 and an insulated gate bipolar transistor Q2 is connected in parallel with the main capacitor 2. R1 is a resistor for detecting current that flows in the primary side coil P of the oscillation transformer T1, R3 and R4 are resistors for detecting voltage charged in the main capacitor 2, and 4 is a high-voltage trigger circuit for generating high-voltage pulse so as to activate the xenon tube 3.

The integrated control circuit device 1 as a pulse width control circuit for controlling charging and emitting operations of the strobe is formed as an integrated circuit including a maximum-duty preset voltage generation circuit 5, a triangular-wave voltage generation circuit 6, a soft-start voltage generation circuit 7, a comparator 8, a primary-coil overcurrent detection circuit 9 for detecting that overcurrent flows in the primary side coil P of the oscillation transformer T1, a secondary-coil current detection circuit 32 for outputting a control signal in order to perform the pulse width control for repeating an operation that detects current in the secondary side coil S of the oscillation transformer T1, waits discharge termination of the current, and conducts the current in the primary side coil P so as to protect a circuit when the main capacitor 2 and the like are in an overload condition caused by, for example, a short circuit of a terminal and the like, a full charge detection circuit 10 for detecting a charging termination, a soft-start voltage canceling circuit 11 for canceling a soft start operation by detecting that a terminal voltage of the main capacitor 2 is charged to a predetermined voltage value on the basis of an increase of a divided voltage of the resistors R3 and R4 to a preset voltage and rapidly increasing the soft-start voltage, a main-capacitor low-voltage detection circuit 30 for determining the overload condition of the separately-excited DC/DC converter at a time when the charging voltage does not reach a predetermined voltage, for example, due to a short circuit of a terminal and the like after a predetermined time elapsed from a start of the charging operation and it is not possible to charge the main capacitor 2, and for outputting an overload signal indicative of the overload condition to the secondary-coil current detection circuit 32 in order to protect a circuit, an AND gate 12, a drive circuit 13 for driving the field effect transistor Q1, and the like.

In addition, a resistor 2 as a time-constant determining element for setting a frequency of a triangular wave generated by the triangular-wave voltage generation circuit 6, and a capacitor 14 as a time-constant determining element for setting a rising curve of the soft-start voltage generated by the soft-start voltage generation circuit 7 are provided outside the integrated control circuit device 1 so as to be connected to the triangular-wave voltage generation circuit 6, and the soft-start voltage generation circuit 7 via the external connection terminals 19 and 20.

In the strobe apparatus serving as the discharge device according to Embodiment 3 configured as described above, normal charging and emitting operations are the same as Embodiment 1, and thus the description thereof will be omitted here.

Hereinafter, a description will be given of a charging operation in a case where an overload condition caused by a short circuit generated by some factors occurs temporally during a period in an output portion, such as the main capacitor 2 and the like, of a DC/DC converter that is a power source for emitting the xenon tube 3.

In order to implement an operation capable of dealing with the case where an overload condition occurs temporally during a period in the output portion of the DC/DC converter as mentioned above, the main-capacitor low-voltage detection circuit 30 and the secondary-coil current detection circuit 32 are provided as shown in FIG. 11.

Figure 12:
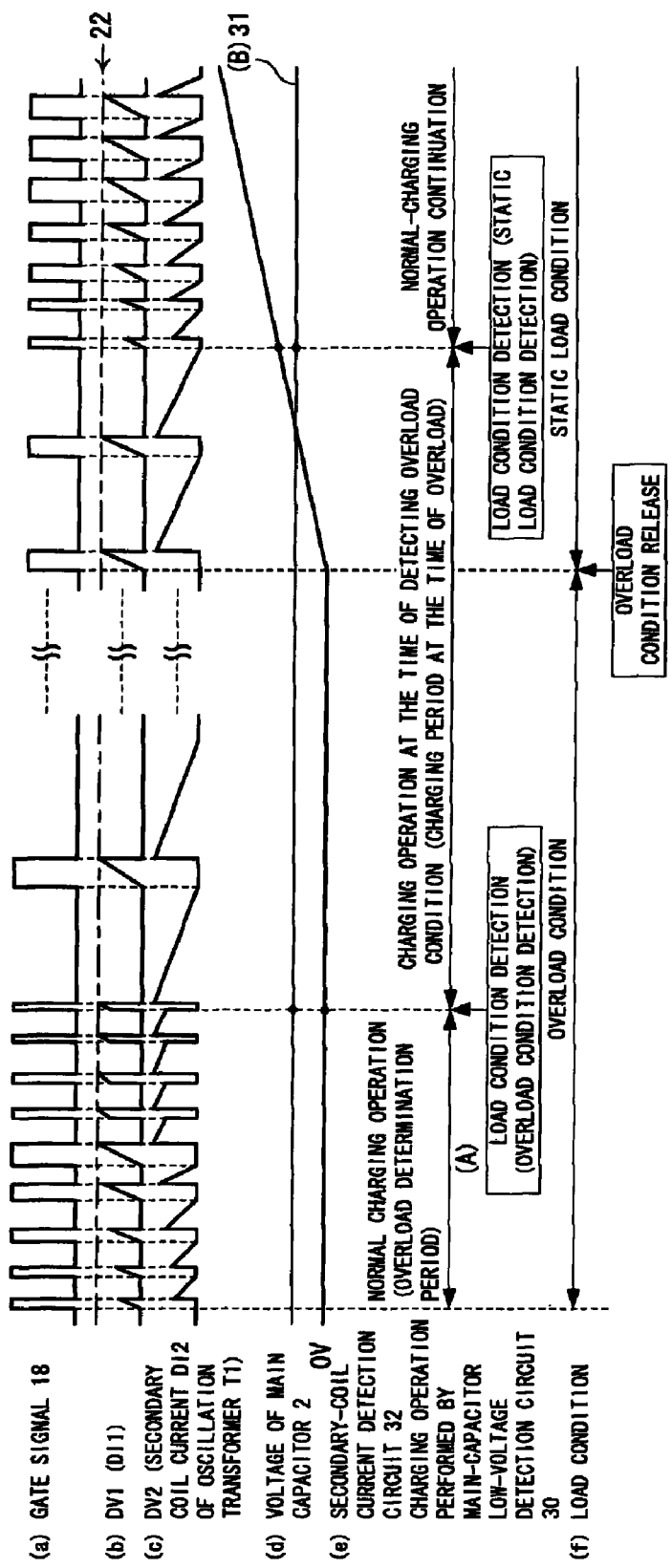
FIG. 12 is a diagram illustrating waveforms of principal portions and a timing chart (1) in an overload condition according to Embodiment 3.

The main-capacitor low-voltage detection circuit 30 is configured to determine the overload condition of the separately-excited DC/DC converter and to output an overload signal indicative of the overload condition to the secondary-coil current detection circuit 32 in order to protect a circuit when the charging voltage does not reach a predetermined voltage, for example, due to a short circuit of a terminal and the like after a predetermined time elapsed from a start of the charging operation and it is not possible to charge the main capacitor 2. In the main-capacitor low-voltage detection circuit 30, a predetermined overload detection voltage (B)31 which is a reference voltage for comparing with a charging voltage of the main capacitor 2 is preset in order to detect that the converter output is in the overload condition with reference to the charging voltage of the main capacitor 2 as shown in FIG. 12. Additionally, the strobe apparatus may be configured such that the overload detection voltage (B)31 is set and stored in an outer portion of the main-capacitor low-voltage detection circuit 30.

In addition, when the secondary-coil current detection circuit 32 receives an overload signal from the main-capacitor low-voltage detection circuit 30 in order to protect the circuit elements in a case where the main capacitor 2 and the like are in the overload condition due to, for example, a short circuit of the terminal and the like, the secondary-coil current detection circuit 32 is configured to output a control signal to the AND gate 12 in order to perform the pulse width control for repeating an operation that detects current DI2 flowing in the secondary side coil S of the oscillation transformer T1 of the separately-excited DC/DC converter by converting the current DI2 into a terminal voltage DV2 in the resistor R5, waits discharge termination of the current, and conducts the current in the primary side coil P.

First, in the main-capacitor low-voltage detection circuit 30, a description will be given of the charging operation in the case where a power source is applied when the output portion of the DC/DC converter is already in the overload condition.

FIG. 12 is a timing chart in the overload condition and shows an operation when the power source is applied in an output overload condition. As shown in FIG. 12, the strobe apparatus starts a normal charging operation of the main capacitor 2 by outputting the gate signal 18 as a converter drive signal from the drive circuit 13 when the power source is applied.

Then, in the main-capacitor low-voltage detection circuit 30, when the charging voltage of the main capacitor 2 does not reach the predetermined overload detection voltage (B)31 even though the normal charging operation is continuously performed during a predetermined constant time (A) as an overload determination period, the circuit judges that the converter output is in the overload condition caused by the short circuit and the like, and outputs the overload signal indicative of the overload condition to the secondary-coil current detection circuit 32.

When the secondary-coil current detection circuit 32 receives the overload signal from the main-capacitor low-voltage detection circuit 30, the secondary-coil current detection circuit 32 outputs a control signal to the AND gate 12 in order to perform the pulse width control for repeating an operation that detects current DI2 flowing in the secondary side coil S of the oscillation transformer T1 of the separately-excited DC/DC converter by converting the current DI2 into a terminal voltage DV2 in the resistor R5, waits discharge termination of the current, and conducts the current in the primary side coil P, as a charging operation performed when the overload condition is detected in the charging period at the time of the overload.

During the charging operation at the time of the overload condition detection performed by the secondary-coil current detection circuit 32, the main-capacitor low-voltage detection circuit 30 continuously compares the overload detection voltage (B)31 and the charging voltage of the main capacitor 2 in predetermined constant periods, detects the load condition on the basis of the comparing result, and outputs the overload signal to the secondary-coil current detection circuit 32 so as to continuously perform the charging operation at the time of the overload condition detection if the overload condition is detected.

As described above, the secondary-coil current detection circuit 32 continuously outputs the control signal to the AND gate 12 in order to perform the charging operation at the time of the charging operation detection, as long as the main-capacitor low-voltage detection circuit 30 continuously outputs the overload signal.

Here, in the charging period at the time of the overload, the main-capacitor low-voltage detection circuit 30 detects the load condition on the basis of the comparing result between the overload detection voltage (B)31 and the charging voltage of the main capacitor 2 and terminates outputting the overload signal to the secondary-coil current detection circuit 32 so as to continuously perform the charging operation by changing to the normal charging operation when the overload condition is previously released, the charging voltage of the main capacitor 2 is equal to or greater than the overload detection voltage (B)31, and the overload condition becomes a static load condition.

As described above, the secondary-coil current detection circuit 32 outputs the control signal to the AND gate 12 in order to continuously perform the same charging operation as the normal operation when the output of the overload signal from the main-capacitor low-voltage detection circuit 30 is terminated.

As described above, since OFF time during the looping drive excessively increases as compared with ON time, power consumption in the overload condition excessively decreases.

Next, in the main-capacitor low-voltage detection circuit 30, a description will be given of a charging operation in a case where the output portion of the DC/DC converter is in the overload condition when the main capacitor 2 is in the state of charging termination.

FIG. 13 is a timing chart in the overload condition and shows an operation at the time of an output overload in the state of the charging termination. In the main-capacitor low-voltage detection circuit 30 of the strobe apparatus as shown in FIG. 13, when the charging voltage of the main capacitor 2 rapidly becomes equal to or lower than the overload detection voltage (B)31 in response to some factors and the state continues for more than a predetermined constant time (C) as the overload determination period even though the normal charging operation is continuously performed, the circuit judges that the converter output is in the overload condition caused by the short circuit and the like and outputs an overload signal indicative of the overload condition to the secondary-coil current detection circuit 32.

When the secondary-coil current detection circuit 32 receives the overload signal from the main-capacitor low-voltage detection circuit 30, the secondary-coil current detection circuit 32 outputs a control signal to the AND gate 12 in order to perform the pulse width control for repeating an operation that detects current DI2 flowing in the secondary side coil S of the oscillation transformer T1 of the separately-excited DC/DC converter by converting the current DI2 into a terminal voltage DV2 in the resistor R5, waits discharge termination of the current, and conducts the current in the primary side coil P, as a charging operation when the overload condition is detected in the charging period at the time of the overload.

In the charging operation at the time of the overload condition detection performed by the secondary-coil current detection circuit 32, the main-capacitor low-voltage detection circuit 30 continuously compares the overload detection voltage (B)31 and the charging voltage of the main capacitor 2 in a predetermined constant-period, detects the load condition on the basis of the comparing result, and outputs the overload signal to the secondary-coil current detection circuit 32 so as to continuously perform the charging operation at the time of the overload condition detection if the overload condition is detected.

As described above, the secondary-coil current detection circuit 32 continuously outputs the control signal to the AND gate 12 in order to perform the charging operation at the time of the overload condition detection, as long as the main-capacitor low-voltage detection circuit 30 continuously outputs the overload signal.

Here, in the charging period at the time of the overload, the main-capacitor low-voltage detection circuit 30 detects the load condition on the basis of the comparing result between the overload detection voltage (B)31 and the charging voltage of the main capacitor 2 and terminates outputting the overload signal to the secondary-coil current detection circuit 32 so as to continuously perform the charging operation by changing to the normal charging operation when the overload condition is previously released, the charging voltage of the main capacitor 2 is equal to or greater than the overload detection voltage (B)31, and the overload condition becomes a static load condition.

As described above, the secondary-coil current detection circuit 32 outputs the control signal to the AND gate 12 in order to continuously perform the same charging operation as the normal operation when the output of the overload signal from the main-capacitor low-voltage detection circuit 30 is terminated.

As described above, since OFF time during the looping drive excessively increases as compared with ON time, power consumption in the overload condition excessively decreases.

In addition, in the main-capacitor low-voltage detection circuit 30, charging operation time (A or C: overload determination period) for determining whether the output portion of the DC/DC converter is in the overload condition is set at an excessively short time by setting a low overload detection voltage (B)31.

The predetermined time (A) varies inversely with an oscillation frequency of the triangular-wave voltage generation circuit 6, that is, varies as a resistance of the resistor R2. The predetermined time (A) is set at a minimum necessary time in order that a voltage of the main capacitor 2 previously reaches a voltage by which it can be determined that the voltage of the capacitor 2 is in a stationary condition as compared with the predetermined overload detection voltage (B)31, when the load condition is stationary on the basis of the result of a simulation by using a threshold of the charging efficiency of the main capacitor 2, the charging voltage of the main capacitor 2, capacity of the main capacitor 2, and the power source voltage and current. In a circuit condition, an oscillation frequency of the triangular-wave voltage generation circuit 6 is set at 600 KHz, but this frequency is set for a case of using the main capacitor 2 (which is mostly used for mobile phones) having a small capacity (about 50 μF or less). When the main capacitor 2 having a large capacity is used, the frequency is lowered, and thus the main capacitor 2 is used for a long time as the predetermined time (A).

In addition, the predetermined voltage (B) is set in consideration of a condition as mentioned below. Specifically, the main capacitor voltage after the emitting operation of the strobe is usually lowered to about 40 to 50V (which is a final voltage of the emitting operation performed by the xenon tube, that is, a minimum voltage capable of continuing a discharging operation). In addition, an aluminum electrolysis capacitor used in the main capacitor 2 may cause a transient recovery voltage of about 10V in response to a polarizing action even after completely discharging in a state where a short circuit occurs in the terminal. Accordingly, the voltage of the main capacitor 2 in the overload condition is set at a voltage greater than the transient recovery voltage in a short-circuited condition of the main capacitor 2 and lower than a voltage after the emitting in the static load condition. That is, the voltage of the main capacitor 2 is set at a value selected in the range of 10 to 40V.

In addition, in a case where the voltage of the main capacitor 2 is precipitously lowered from a stationary state of charging termination, for example, a load condition becomes the overload, the strobe is emitted in the static load condition, and so on, there is a clear reason why the load condition is changed with respect to the precipitous decrease of the voltage of the main capacitor 2. Therefore, there is no problem even when the predetermined time (C) is sufficiently shorter than the predetermined time (A), as the overload determination period for detecting the load condition (or the overload condition), but the predetermined time (C) may be set at the same time as the predetermined time (A) on the basis of the same reason as in the case of the predetermined time (A) and a necessity of a more precise detection result for the load condition. However, in order not to misjudge the load condition, at least 1 milli-second (ms) or more time is necessary.

As described above, according to the embodiment, for example, by using an evaluation board made of ceramic material, when the driving frequency is 600 kilohertz (kHz), the power source voltage is 4.2 volt (V), the inductance of the primary side coil P in the oscillation transformer T1 is 2.2 micro henry (μH), voltage step-up ratio of the primary side coil P to the secondary side coil S is 17.5, and the primary-side resistor R1 is 0.1 ohm (Q) as the above-described circuit condition, the predetermined values are set such that the predetermined time (A) in the charging operation is about 250 milli-second (ms) as shown in FIG. 12, the predetermined voltage (B) of an overload detection voltage 31 is about 20 volt (V) in FIGS. 12 and 13, and the predetermined time (C) in the charging operation is about 10 milli-second (mS) as shown in FIG. 13.

With such a configuration, the charging current of the main capacitor 2 can be suppressed by the primary-coil overcurrent detection circuit 9 at the time of the overload such as a short circuit of the main capacitor 2.

In addition, in a case where the charging voltage of the main capacitor 2 does not reach the predetermined voltage after a predetermined time elapsed from start of the charging operation, the main-capacitor low-voltage detection circuit 30 determines that the main capacitor 2 is in the overload condition and outputs the overload signal indicative of the overload condition to the secondary-coil current detection circuit 32, whereby the drive circuit 13 performs the looping drive that waits the discharging termination of the current in the secondary side and moves to the conduction operation of the primary side. During this looping drive, in a case where the charging voltage of the main capacitor 2 reaches the predetermined voltage, the main-capacitor low-voltage detection circuit 30 determines that the main capacitor 2 is in the static load condition and terminates outputting the overload signal to the secondary-coil current detection circuit 32, whereby the drive circuit 13 performs the normal charging drive. The main-capacitor low-voltage detection circuit 30 outputs the control signal to the AND gate 12 so as to perform the drives as described above, and thus it is possible to perform the pulse width control.

In addition, in a case where the charging voltage of the main capacitor 2 is the predetermined voltage or less, the charging operation is restarted, and the charging voltage of the main capacitor 2 does not reach the predetermined voltage after a predetermined time elapsed when the charging operation is terminated, the main-capacitor low-voltage detection circuit 30 determines that the main capacitor 2 is in the overload condition and outputs the overload signal indicative of the overload condition to the secondary-coil current detection circuit 32, whereby the drive circuit 13 performs the looping drive that waits the discharging termination of the current in the secondary side and moves to the conduction operation of the primary side. During this looping drive, in a case where the charging voltage of the main capacitor 2 reaches the predetermined voltage, the main-capacitor low-voltage detection circuit 30 determines that the main capacitor 2 is in the static load condition and terminates outputting the overload signal to the secondary-coil current detection circuit 32, whereby the drive circuit 13 performs the normal charging drive. The main-capacitor low-voltage detection circuit 30 outputs the control signal to the AND gate 12 so as to perform the drives as described above, and thus it is possible to perform the pulse width control.

As a result, it is possible to excessively decrease a size of the configuration, to suppress heat generation by preventing the overcurrent, and to protect a circuit element against destruction caused by the heat generation, even when the charging operation is performed in the case where the main capacitor 2 is in the condition of overload such as a short and the charging voltage is excessively lowered, where a pulse width is controlled by a random control frequency selected in the range of low to high frequencies.

INDUSTRIAL APPLICABILITY

The discharge device according to the invention can decrease the size of the configuration and protect the circuit element by preventing the heat generation caused by the overcurrent, even when the main capacitor is in the overload condition such as a short circuit in the case where the drive is performed by using not only a low frequency but also a high frequency. Therefore, it is possible to apply the discharge device to a strobe apparatus, an application specific integrated circuit having the function thereof, and the like.

The invention claimed is:

1. A discharge device for charging a main capacitor via a separately-excited DC/DC converter and discharging energy from the main capacitor, the discharge device comprising a pulse width control circuit for controlling a conduction pulse width on a primary side of the separately-excited DC/DC converter, wherein the pulse width control circuit is configured to perform a PWM soft start drive of stepwise increasing the conduction pulse width on the primary side of the separately-excited DC/DC converter up to a maximum pulse width when the main capacitor has a voltage less than a predetermined low voltage at the time of charging the main capacitor, to perform a PWM drive with the maximum pulse width when the main capacitor has a voltage not less than the predetermined low voltage at the time of charging the main capacitor, to perform the PWM drive with the maximum pulse width by detecting that the main capacitor reaches a predetermined voltage and terminating the PWM soft start drive in course of performing the PWM soft start drive of stepwise increasing the conduction pulse width on the primary side of the separately-excited DC/DC converter up to a maximum pulse width when the main capacitor has a voltage less than the predetermined low voltage at the time of charging the main capacitor, and to determine that the separately-excited DC/DC converter is in an overload condition and to perform the pulse width control by the use of an intermittent drive of alternately performing a charging operation and a no-charging operation on the main capacitor at a predetermined time ratio when a charging voltage of the main capacitor does not reach a predetermined voltage with the lapse of a predetermined time after starting the charging operation.

2. The discharge device according to claim 1, wherein the pulse width control circuit includes a triangular-wave voltage generation circuit for generating a triangular-wave voltage at a predetermined repetition frequency; a soft-start voltage generation circuit for generating a soft-start voltage that increases with the lapse of time after starting the charging operation; a comparator for comparing the triangular-wave voltage with the soft-start voltage and outputting a signal with a duty ratio that gradually increases a conduction time at a single frequency with the time elapsed from the start of the charging operation; a soft-start voltage canceling circuit for canceling a soft start operation by detecting that a terminal voltage of the main capacitor increases to a preset voltage; and a logic circuit for charging the main capacitor on the basis of an output of the comparator until the main capacitor is fully charged and terminating the charging operation when detecting that the main capacitor is fully charged.

3. The discharge device according to claim 2, wherein the pulse width control circuit further includes a primary-coil overcurrent detection circuit for detecting that overcurrent flows on the primary side of the separately-excited DC/DC converter and turning off the logic circuit.

4. An application specific integrated circuit constituting the discharge device according to claim 2, the application specific integrated circuit comprising:
   a triangular-wave voltage generation circuit for generating a triangular-wave voltage at a single frequency;
   a soft-start voltage generation circuit for generating a soft-start voltage that increases with the lapse of time after starting the charging operation;
   a comparator for comparing the triangular-wave voltage with the soft-start voltage and outputting a signal with a duty ratio that gradually increases a conduction time at a single frequency with the time elapsed from the start of the charging operation;
   a soft-start voltage canceling circuit for canceling a soft start operation by detecting that a terminal voltage of the main capacitor increases to a preset voltage; and
   a logic circuit for charging the main capacitor on the basis of an output of the comparator until the main capacitor is fully charged and terminating the charging operation when detecting that the main capacitor is fully charged.

5. The application specific integrated circuit according to claim 4, further comprising a primary-coil overcurrent detection circuit for detecting that overcurrent is generated on the primary side of the separately-excited DC/DC converter and turning off the logic circuit.

6. The application specific integrated circuit according to claim 4, further comprising an external connection terminal connected to a time-constant determining element of at least one of the triangular-wave voltage generation circuit and the soft-start voltage generation circuit.

7. The discharge device according to claim 1, wherein the pulse width control circuit includes a triangular-wave voltage generation circuit for generating a triangular-wave voltage at a predetermined repetition frequency; a soft-start voltage generation circuit for generating a soft-start voltage that increases with the lapse of time after starting the charging operation; a comparator for comparing the triangular-wave voltage with the soft-start voltage and outputting a signal with a duty ratio that gradually increases a conduction time at a single frequency with the time elapsed from the start of the charging operation; a soft-start voltage canceling circuit for canceling a soft start operation by detecting that a terminal voltage of the main capacitor increases to a preset voltage; a logic circuit for charging the main capacitor on the basis of an output of the comparator until the main capacitor is fully charged and terminating the charging operation when detecting that the main capacitor is fully charged; and a means for determining that the separately-excited DC/DC converter is in an overload condition and performing the pulse width control by the use of an intermittent drive of alternately performing a charging operation and a no-charging operation on the main capacitor at a predetermined time ratio when a charging voltage of the main capacitor does not reach a predetermined voltage with the lapse of a predetermined time after starting the charging operation.

8. An application specific integrated circuit constituting the discharge device according to claim 7, the application specific integrated circuit comprising:
   a triangular-wave voltage generation circuit for generating a triangular-wave voltage at a single frequency;
   a soft-start voltage generation circuit for generating a soft-start voltage that increases with the lapse of time after starting the charging operation;
   a comparator for comparing the triangular-wave voltage with the soft-start voltage and outputting a signal with a duty ratio that gradually increases a conduction time at a single frequency with the time elapsed from the start of the charging operation;
   a soft-start voltage canceling circuit for canceling a soft start operation by detecting that a terminal voltage of the main capacitor increases to a preset voltage;
   a logic circuit for charging the main capacitor on the basis of an output of the comparator until the main capacitor is fully charged and terminating the charging operation when detecting that the main capacitor is fully charged; and
   a means for determining that the separately-excited DC/DC converter is in an overload condition and performing the pulse width control by the use of an intermittent drive of alternately performing a charging operation and a no-charging operation on the main capacitor at a predetermined time ratio when a charging voltage of the main capacitor does not reach a predetermined voltage with the lapse of a predetermined time after starting the charging operation.

9. A discharge device for charging a main capacitor via a separately-excited DC/DC converter and discharging energy from the main capacitor, the discharge device comprising a pulse width control circuit for controlling a conduction pulse width on a primary side of the separately-excited DC/DC converter,
   wherein the pulse width control circuit is configured
   to perform a PWM soft start drive of stepwise increasing the conduction pulse width on the primary side of the separately-excited DC/DC converter up to a maximum pulse width when the main capacitor has a voltage less than a predetermined low voltage at the time of charging the main capacitor,
   to perform a PWM drive with the maximum pulse width when the main capacitor has a voltage not less than the predetermined low voltage at the time of charging the main capacitor,
   to perform the PWM drive with the maximum pulse width by detecting that the main capacitor reaches a predetermined voltage and terminating the PWM soft start drive in course of performing the PWM soft start drive of stepwise increasing the conduction pulse width on the primary side of the separately-excited DC/DC converter up to a maximum pulse width when the main capacitor has a voltage less than the predetermined low voltage at the time of charging the main capacitor, and
   to determine that the separately-excited DC/DC converter is in an overload condition and to perform the pulse width control by the use of a looping drive of waiting discharge termination of current on the secondary side of the separately-excited DC/DC converter and performing a conduction operation of the primary side thereof when a charging voltage of the main capacitor does not reach a predetermined voltage with the lapse of predetermined time after starting the charging operation at the time of charging the main capacitor.

10. The discharge device according to claim 9, wherein the pulse width control circuit includes a triangular-wave voltage generation circuit for generating a triangular-wave voltage at a predetermined repetition frequency; a soft-start voltage generation circuit for generating a soft-start voltage that increases with the lapse of time after starting the charging operation; a comparator for comparing the triangular-wave voltage with the soft-start voltage and outputting a signal with a duty ratio that gradually increases a conduction time at a single frequency with the time elapsed from the start of the charging operation; a soft-start voltage canceling circuit for canceling a soft start operation by detecting that a terminal voltage of the main capacitor increases to a preset voltage; a logic circuit for charging the main capacitor on the basis of an output of the comparator until the main capacitor is fully charged and terminating the charging operation when detecting that the main capacitor is fully charged; a means for determining that the separately-excited DC/DC converter is in an overload condition when a charging voltage of the main capacitor does not reach a predetermined voltage with the lapse of a predetermined time after starting the charging operation and outputting an overload signal indicative of the overload condition; and a secondary-coil current detection circuit for controlling the pulse width control by performing a looping drive of detecting secondary side current of the separately-excited DC/DC converter, waiting discharge termination of the current, and performing a conduction operation of the primary side thereof, when receiving the overload signal.

11. An application specific integrated circuit constituting the discharge device according to claim 10, the application specific integrated circuit comprising:
   a triangular-wave voltage generation circuit for generating a triangular-wave voltage at a single frequency;
   a soft-start voltage generation circuit for generating a soft-start voltage that increases with the lapse of time after starting the charging operation;
   a comparator for comparing the triangular-wave voltage with the soft-start voltage and outputting a signal with a duty ratio that gradually increases a conduction time at a single frequency with the time elapsed from the start of the charging operation;
   a soft-start voltage canceling circuit for canceling a soft start operation by detecting that a terminal voltage of the main capacitor increases to a preset voltage;
   a logic circuit for charging the main capacitor on the basis of an output of the comparator until the main capacitor is fully charged and terminating the charging operation when detecting that the main capacitor is fully charged;
   a means for outputting an overload signal indicative of the overload condition by determining that the separately-excited DC/DC converter is in an overload condition when a charging voltage of the main capacitor does not reach a predetermined voltage with the lapse of a predetermined time after starting the charging operation; and
   a secondary-coil current detection circuit for controlling the pulse width control by performing a looping drive of detecting secondary side current of the separately-excited DC/DC converter, waiting discharge termination of the current, and performing a conduction operation of the primary side thereof, when receiving the overload signal.

* * * * *